US012744768B2

(12) United States Patent
Hoagland

(10) Patent No.: US 12,744,768 B2
(45) Date of Patent: Sep. 22, 2026

(54) SYSTEMS AND METHODS FOR CONNECTING USERS IN AN EXTENDED REALITY SETTING

(71) Applicant: RalphVR Inc., Lexington, KY (US)

(72) Inventor: Richard Hoagland, Lexington, KY (US)

( * ) Notice: Subject to any disclaimer, the term of this patent is extended or adjusted under 35 U.S.C. 154(b) by 635 days.

(21) Appl. No.: 17/893,929

(22) Filed: Aug. 23, 2022

(65) Prior Publication Data

US 2023/0057203 A1 Feb. 23, 2023

Related U.S. Application Data

(60) Provisional application No. 63/235,856, filed on Aug. 23, 2021.

(51) Int. Cl.
*H04L 9/40* (2022.01)

(52) U.S. Cl.
CPC ........ *H04L 63/0823* (2013.01); *H04L 63/102* (2013.01)

(58) Field of Classification Search
CPC . H04L 63/08; H04L 63/0807; H04L 63/0823; H04L 63/0876; H04L 63/102;
(Continued)

(56) References Cited

U.S. PATENT DOCUMENTS 8,166,110 B2 4/2012 Malik
8,707,394 B2 4/2014 Tam et al.
(Continued)

FOREIGN PATENT DOCUMENTS

EP 3156912 B1 1/2020
KR 101244989 B1 3/2013
(Continued)

OTHER PUBLICATIONS

Vega-Barbas, M., Seoane, F., Pau, I. "Characterization of User-Centered Security in Telehealth Services". Feb. 26, 2019. International Journal of Environmental Research and Public Health. vol. 16. 2019. (Year: 2019).*
(Continued)

*Primary Examiner* — Rupal Dharia
(74) *Attorney, Agent, or Firm* — Dean Cummins Law Firm

(57) ABSTRACT

Systems and methods for connecting users in an extended reality setting are provided. One embodiment includes creating a private group for an extended reality session, registering a facility user for the private group and a first user identifier for the facility user, and registering a first device to link to the facility user. Some embodiments include registering a first user for the private group and a second user identifier for the first user, registering a second device to link to the first user, and receiving a request from a device of a possible user to join the session. Still some embodiments include retrieving a security certificate from the device, determining whether the security certificate corresponds, and in response to determining that the security certificate corresponds granting access to the possible user to the extended reality session. In response to determining that the security certificate does not correspond, denying access.

20 Claims, 18 Drawing Sheets
(6 of 18 Drawing Sheet(s) Filed in Color)

(58) Field of Classification Search

CPC ....... H04L 63/00; H04L 9/3263; G06F 21/31; G06F 21/33; G06F 21/335; G06F 21/44; G06F 19/00; G06F 21/30; G06T 19/006; G06T 19/00

See application file for complete search history.

(56) References Cited

U.S. PATENT DOCUMENTS

| | | | | |
|---|---|---|---|---|
| 8,849,914 | B2 | 9/2014 | Bove et al. | |
| 8,966,445 | B2 | 2/2015 | Ahlgren et al. | |
| 9,178,753 | B2 | 11/2015 | Micucci et al. | |
| 9,401,906 | B2 | 7/2016 | Braddy et al. | |
| 9,569,596 | B2 | 2/2017 | Marcus et al. | |
| 10,264,095 | B2 | 4/2019 | La Rotonda et al. | |
| 10,304,144 | B2 | 5/2019 | Chandran et al. | |
| 10,949,933 | B2 | 3/2021 | Ryan et al. | |
| 11,265,721 | B1 * | 3/2022 | Satpathy | G02B 30/22 |
| 2009/0150562 | A1 * | 6/2009 | Kim | H04L 65/1104 709/238 |
| 2010/0229235 | A1 * | 9/2010 | Dawson | H04L 9/3265 713/171 |
| 2012/0302212 | A1 | 11/2012 | Ross et al. | |
| 2013/0110537 | A1 | 5/2013 | Smith | |
| 2014/0067980 | A1 * | 3/2014 | La Rotonda | G06Q 50/01 709/206 |
| 2015/0134343 | A1 | 5/2015 | Kluger et al. | |
| 2015/0229627 | A1 * | 8/2015 | Yasuma | H04L 63/104 726/4 |
| 2016/0300031 | A1 | 10/2016 | Salwan | |
| 2016/0302666 | A1 | 10/2016 | Shaya | |
| 2017/0011194 | A1 | 1/2017 | Arshad et al. | |
| 2017/0039770 | A1 * | 2/2017 | Lanier | H04W 12/02 |
| 2018/0109507 | A1 | 4/2018 | Caldera et al. | |
| 2018/0159841 | A1 * | 6/2018 | Toff | H04L 63/08 |
| 2019/0128676 | A1 * | 5/2019 | Naik | G01C 21/206 |
| 2019/0251244 | A1 * | 8/2019 | Li | G06F 3/0482 |
| 2020/0020454 | A1 | 1/2020 | Mcgarvey et al. | |
| 2020/0302040 | A1 * | 9/2020 | Kaja | G06F 21/54 |
| 2020/0358775 | A1 * | 11/2020 | Higgins | H04L 41/0894 |
| 2021/0117558 | A1 * | 4/2021 | Robbins | G06F 21/604 |
| 2021/0135895 | A1 * | 5/2021 | Cheung | G06F 3/0304 |
| 2021/0209249 | A1 * | 7/2021 | Hoffer | G16H 50/20 |
| 2023/0179402 | A1 * | 6/2023 | Murdoch | H04L 9/0891 713/171 |

FOREIGN PATENT DOCUMENTS

| | | | | |
|---|---|---|---|---|
| KR | 101818022 | B1 | 2/2018 | |
| KR | 20210085929 | A * | 7/2021 | G06Q 50/01 |
| WO | 2004036807 | A2 | 4/2004 | |
| WO | 2019217938 | A1 | 11/2019 | |

OTHER PUBLICATIONS

H. Regenbrecht, D. Wickeroth, B. Dixon and S. Mueller, “Collaborative Mixed Reality Exposure Therapy,” 2006 International Conference on Cyberworlds, Lausanne, Switzerland, 2006, pp. 25-32. (Year: 2006).*

* cited by examiner

FIG. 15
1320
1324
Players
Activities
Devices
Settings
August - 15 18:14:31
Louvre
Start
Play Video
Move Players
Reset
Paris Art Cafe
Previous
Next
Autoplay
Loop
Test User 2
Logs
2
3
1524a
1524b
1524c
1524d
1522a
1522b
1526a
1526b
1526c
1526d
1528a
1528b

SYSTEMS AND METHODS FOR CONNECTING USERS IN AN EXTENDED REALITY SETTING

CROSS REFERENCE

This application claims the benefit of U.S. Provisional Application Ser. No. 63/235,856, filed Aug. 23, 2021, which is hereby incorporated by reference in its entirety.

TECHNICAL FIELD

Embodiments described herein generally relate to systems and methods for connecting users in an extended reality setting and, more specifically, to creating a secure extended reality platform for a designated group of users.

BACKGROUND

Currently extended reality (XR) applications, such as virtual reality (VR), augmented reality (AR) and/or mixed reality (MR) are increasing in popularity, both in the gaming context and in the metaverse context. As such, these applications are primarily targeted to younger users who are technologically sophisticated and desire to experience the virtual worlds provided by these applications.

With that said, there are a number of populations that would benefit greatly from access to extended reality technologies, but these populations require additional security measures to protect their safety and security, including but not limited to their personal health information (PHI), financial information, and technological competency level, which presents security, compliance, and implementation issues in a networked social scenario. These include but are not limited to adults with diminished mental capacity, adults with physical disabilities, older adults (especially in managed living settings), and patients in healthcare systems. The issues fall into two categories: security of connection and ease of connection.

For various reasons, these populations are often targeted in various criminal undertakings, such as data breach, identity theft, etc. In order to guard against these risks, connection security must be guarded. The facilitation of random connections between users that is encouraged by the current iterations of the social XR systems goes counter to these issues.

Extended reality enables new forms of interacting and as a result, significant forms of user-data, including PHI, is possible to be collected and sent over the network during a real-time interaction between users, whether the collection and transmission is intentional by the system or not. As an example, a user shares their own PHI through voice chat capabilities while in a networked extended reality experience, or telemetry data pulled from a device including head and hand movements could be investigated by an algorithm that detects a known or unknown health condition of the user. Further, learning how to interact with virtual reality software and connect/access networked multi-user experiences has a demanding cognitive load, preventing individuals from accessing health and treatment options, as well as increasing the potential for malicious actors to collect private information. The process of connecting two users in a virtual environment involves multiple levels of communication. Users with access to current XR hardware typically make previous arrangements to meet within a specific virtual "room" of a specific software product. Some platform- or application-specific capabilities for messaging are often utilized for actually arriving at the desired virtual destination. This requires context switching and knowledge of various software systems. Subsequently, setting up virtual reality experiences for individuals not highly literate in technology is a challenging task with no current solution.

Other challenges encountered when facilitating an extended reality experience for another user include no direct access to the virtual world to observe and adjust its state brighten the skies, change the color of the user avatar, etc. in real-time in order to facilitate better user experience, as well as no ability to connect users together in a multi-user virtual space and monitor all connections, devices, and users regardless of location.

Thus, a need exists in the industry for connecting users in an extended reality setting.

SUMMARY

Systems and methods for connecting users in an extended reality setting are provided. One embodiment includes creating a private group for an extended reality session, registering a facility user for the private group and a first user identifier for the facility user, and registering a first device to link to the facility user. Some embodiments include registering a first user for the private group and a second user identifier for the first user, registering a second device to link to the first user, and receiving a request from a device of a possible user to join the extended reality session. Still some embodiments include retrieving a security certificate from the device, determining whether the security certificate corresponds, and in response to determining that the security certificate corresponds granting access to the possible user to the extended reality session. In response to determining that the security certificate does not correspond, denying access.

In another embodiment, a system includes a remote computing device that stores logic that, when executed by the remote computing device, causes the system to create a private group for an extended reality session, register a facility user for the private group and a first user identifier for the facility user, and register a first device to link to the facility user, where registering the first device includes creating a first security certificate with an identifier of the private group to be stored at the first device. In some embodiments, the logic causes the system to register a first user for the private group and a second user identifier for the first user, register a second device to link to the first user, where registering the second device includes creating a second security certificate with the identifier of the private group to be stored at the second device, and receive a request from a device of a possible user to join the extended reality session. In some embodiments, the logic causes the system to retrieve a security certificate from the device, determine whether the security certificate corresponds with at least one of the following: the first security certificate or the second security certificate, whether the possible user corresponds with the at least one of the following: the facility user or the first user, and whether the device corresponds to at least one of the following: the first device or the second device, and in response to determining that the security certificate corresponds with the first security certificate, the possible user corresponds to the facility user and the device corresponds to the first device or the security certificate corresponds with the second security certificate, the possible user corresponds to the first user and the device corresponds to the second device, grant access to the possible user to the extended reality session. In some embodiments, in response to determining that the security certificate does not correspond to the first security certificate, the possible user does not correspond to the facility user, or the device does not correspond to the first device, or the security certificate does not correspond to the second security certificate, the possible user does not correspond to the first user, or the device does not correspond to the second device, the logic causes the system to deny access to the possible user to the extended reality session.

In yet another embodiment, a computing device includes a memory component that stores logic, that when executed by the computing device, causes the computing device to create a private group for an extended reality session, register a facility user for the private group and a first user identifier for the facility user, and register a first device to link to the facility user, where registering the first device includes creating a first security certificate with an identifier of the private group to be stored at the first device. In some embodiments, the logic causes the computing device to register a first user for the private group and a second user identifier for the first user, register a second device to link to the first user, where registering the second device includes creating a second security certificate with the identifier of the private group to be stored at the second device, and receive a request from a device of a possible user to join the extended reality session. In some embodiments, the logic causes the computing device to retrieve a security certificate from the device, determine whether the security certificate corresponds with at least one of the following: the first security certificate or the second security certificate, whether the possible user corresponds with the at least one of the following: the facility user or the first user, and whether the device corresponds to at least one of the following: the first device or the second device, and in response to determining that the security certificate corresponds with the first security certificate, the possible user corresponds to the facility user and the device corresponds to the first device or the security certificate corresponds with the second security certificate, the possible user corresponds to the first user and the device corresponds to the second device, grant access to the possible user to the extended reality session. In some embodiments, in response to determining that the security certificate does not correspond to the first security certificate, the possible user does not correspond to the facility user, or the device does not correspond to the first device, or the security certificate does not correspond to the second security certificate, the possible user does not correspond to the first user, or the device does not correspond to the second device, the logic causes the computing device to deny access to the possible user to the extended reality session.

These and additional features provided by the embodiments of the present disclosure will be more fully understood in view of the following detailed description, in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
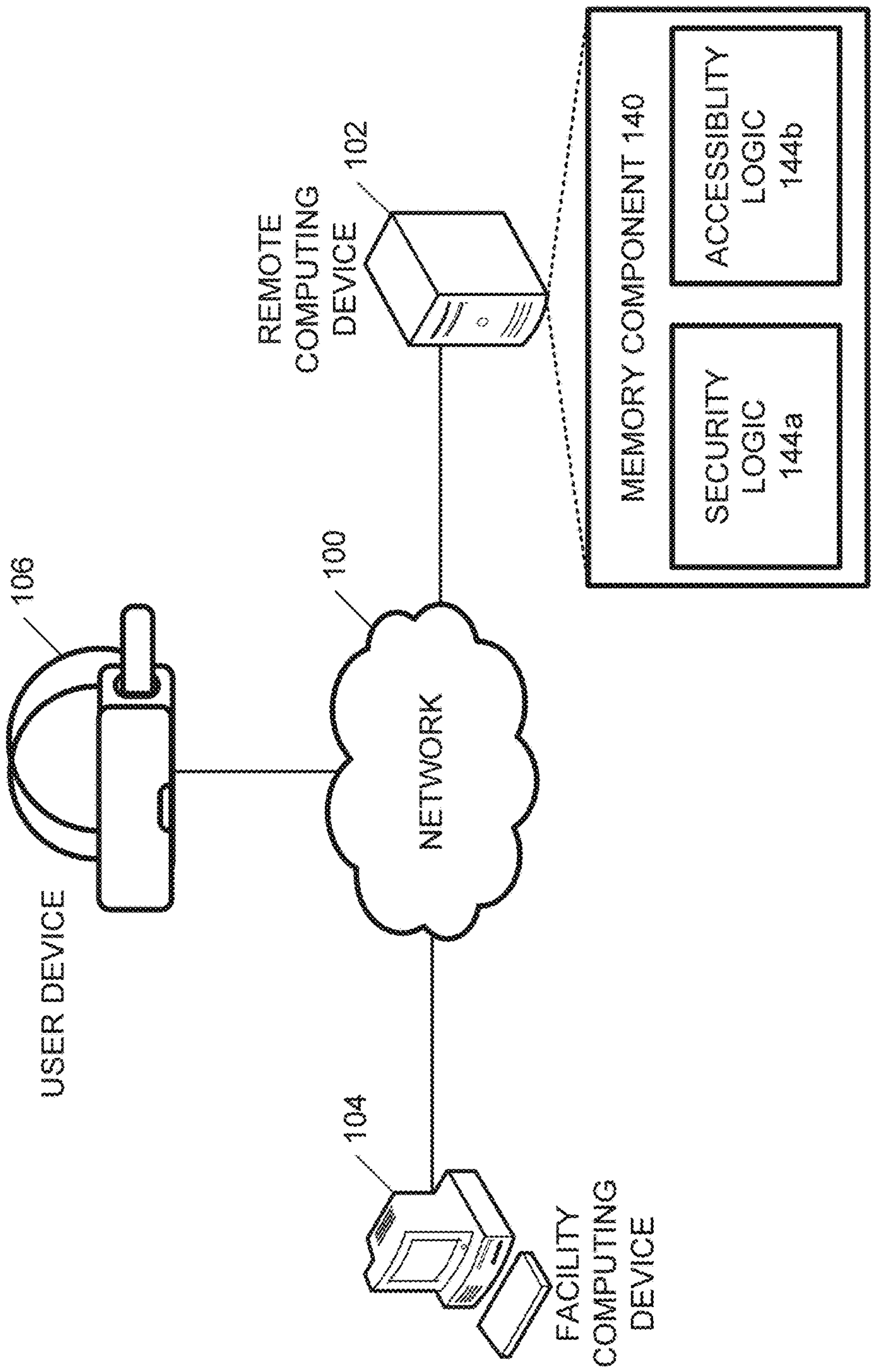
FIG. 1 depicts a computing infrastructure to facilitate a connection inside a virtual environment, according to embodiments provided herein.

Embodiments disclosed herein include systems and methods for connecting users in an extended reality setting. Some embodiments combine observation with the ability to manipulate virtual space. These embodiments may be configured to communicate between a real-time networking XR application and administrative client application, as well as monitor, set, and modify settings, including but not limited to accessibility settings, user-profile settings, and experience state to ensure a safe, secure, complaint, and accessible delivery of application, treatment, intervention, and experience.

Current solutions provide no ability to connect users together in a secure, safe, secure, accessible, and compliant multi-user virtual space. Embodiments described herein provide an interface for an administrator to add, manage, and observe all devices on an intranet the administrator sets up. The system and interface uses a multi-step authentication system when adding new users and devices to the network, and during each dynamic real-time XR session, to enable the administrator to ensure safe, secure, accessible, and compliant intranet and real-time connections, with software system rules to reinforce proper setup and management of the system. This allows a facility, healthcare organization, or other, to deliver XR digital health and digital therapeutic experiences, treatments, interventions, and applications that is safe, secure, accessible, and compliant which is currently an unsolved challenge in the industry of digital health and therapeutics, an industry growing rapidly. This allows users with no technology literacy and virtual reality experience to accesses these digital heath and digital therapeutic treatments, and ensures the delivery to be safe, secure, accessible, and compliant.

Some embodiments may also monitor and maintain some or all connections, devices, and users due on the platform. For example, users might experience network latency or one of the users might experience a health problem. Both of these cases may be reported to the administrator to allow for a smooth technical or medical issue resolution. Embodiments may provide a user interface that presents information about connected nodes to the administrator. Further, some embodiments may collect device diagnostics, user diagnostic, health, usage, and other diagnostics, encrypted, sent over the network, and store, in a compliant manner. This information may be reported over the network, meaning the administrator does not have to be physically near a user to monitor their experience.

In a care facility setting (e.g., residential care home, continuing care retirement community, assisted living community, nursing home/skilled nursing facility) residents with various diminished capacities may need help navigating the connection to their friends and family members in a virtual environment. Similar help may be needed for long-term patients in various medical facilities who would greatly benefit from a connection with loved ones in a virtual environment but are, for various medical reasons, unable to make the connection on their own. Some additional sections could include senior care facilities, healthcare organizations, children's hospitals, researchers working under institutional review board (IRB) approval, psychiatric outpatient facilities, and others which may desire to distribute digital health and digital therapeutic experiences, applications, treatments, and interventions, which may require the creation of time-specific sub-networks of pre-defined list of users and devices, such that a group of individuals may safely come together in a virtual room to participate in and receive the application, experience, treatment, or intervention in a real-time networked virtual environment. Some embodiments provide the above entities a process to dynamically create and manage these sub-networks. An example would be a therapist creating a group session each week for four of their patients.

To address these and other problems, embodiments provided herein are directed to a platform that allows a designated user with administrative privileges on the platform to establish and monitor the connections between multiple users of an extended reality environment. The user experience is that of an immediate connection to the desired communication partner (or group of partners) on the platform within the extended reality environment of their choice without having to negotiate the logistics of the connection on their own in a manner that prevents unwanted devices or users from accessing the virtual environment and preventing access to all data being sent over the network.

It should also be understood that embodiments provided herein include a plurality of modes for the administrator. A first mode may include a network level mode, which may be accessed on a XR devices, tablet, or web-page, and allows the administrator to manage the network, users, and devices. A second mode includes an application level mode. The application level mode may be configured to allow the administrator to monitor and manage a specific real-time sub-network session room.

In some embodiments, the users are able to access a group network on preapproved devices using unique certificates matched to specific administrator pre-approved hardware devices. The administrator is able to view, via the software product, all of the connected and available devices on the platform. The administrator is able, via a user interface, to connect specific users to a specific environment. The software product interface allows the administrator to create and monitor multiple sessions and set start times and end times for these sessions connecting two or more users in a virtual environment.

Each session may be displayed graphically as icons, each with a unique identifier. Lines connecting sessions with hardware devices indicate devices connected to the session. User input on the session icon brings up status information and a control window. Status information includes unique identifiers of connected devices, sessions and network diagnostics, session error logging terminal. A control window includes an option to establish a voice-over-internet protocol (VOIP) connection to all devices connected to the session, an option to connect to real-time networked software as a user with administrative privileges, and a panel exposing customization options for the session including session device count maximum, experience- and world-state, and general game options.

A representation of each hardware device connected to the network may be displayed graphically as an icon and unique identifier. User input on the icon brings up status information and control window. Status information includes hardware information (e.g., online/offline, battery power, volume level, and nickname), virtual reality software information (e.g., network performance and stability, virtual world- and player-state, error logging), and user information (e.g., software detected issues such as falls, low activity level, or other flags). The control window includes an option to establish a VOIP connection, an option to connect directly to real-time networked software as a user with administrator privileges, and a panel exposing customization options for the connected user including avatar customizations, comfort and accessibility options, and general game-player options. A notification icon may be displayed on top of the hardware device icon if a flag is thrown. Flags include a user help request, a hardware device or network issue, or a software-detected concern for the user.

When an individual accesses the network, that individual must do so logged in as a user. A security certificate may be stored on the user's device, which may be used with user information to connect to a predetermined group. Some embodiments validate that the user can connect to the group and that the device is valid for use both by the group and by the user. The individual automatically joins a group default session, which is a persistent session created automatically when the group was created. If the user and device are listed for a sub-network Session currently running, the software system will notify the individual of all active sessions they can join, the software system may list upcoming, scheduled, or past sessions as well.

Accordingly, embodiments provided herein include a system that enables the partition of a collection of users and devices into organizational groups, and per-entity connections, that ensures standards compliance (e.g., Health Insurance Portability and Accountability Act (HIPAA)) through the obfuscation of personally identifiable information. Users may still share their information voluntarily with each other after agreeing to a user-to-user connection (whitelisting), or within an organizational group. All interactions can be monitored by a trusted administrator and/or medical professional (or other approved facility user) in order to assure an additional level of security when working with vulnerable populations such as older adults or adults with diminished mental capacities. The systems and methods for connecting users in an extended reality setting incorporating the same will be described in more detail, below.

Referring now to the drawings, FIG. 1 depicts a computing infrastructure to facilitate a connection inside a virtual environment, according to embodiments provided herein. As illustrated, the computing infrastructure might include a network 100. The network 100 may include any communications network, such as a wide area network (WAN), such as the internet, a public switched telephone network, and/or other regional or global network. The network 100 may include a local network, such as a local area network (LAN), wireless fidelity (Wi-Fi) network, or other network over shorter ranges. The network 100 may include a peer-to-peer network, such as via Bluetooth, near field communication, a wired connection, etc.

Coupled to the network 100 is a remote computing device 102, a facility computing device 104, and a user device 106. The remote computing device 102 may be configured as a personal computer, server, laptop, mobile device, and/or other computing device for storing the logic and providing the functionality provided herein. In some embodiments, the remote computing device 102 may be physically located separate from the facility, such that the remote computing device 102 serves a plurality of facilities. In some embodiments however, the remote computing device 102 may only service one facility (or limited group of related facilities).

Accordingly, the remote computing device 102 may include a memory component 140 that stores security logic 144*a* and accessibility logic 144*b*. The security logic 144*a* may include instructions for causing the remote computing device 102 to provide security measures utilized in the XR platform. The accessibility logic 144*b* may include instructions for causing the remote computing device 102 to provide the XR platform to the administrators and/or user, as well as provide accessibility features described herein.

Also provided in FIG. 1 is a facility computing device 104. The facility computing device 104 may be configured as a personal computer, laptop, tablet, mobile device, XR headset, etc. and may be configured to provide access to the XR platform to one or more providers. The providers may include administrators, health professionals, mediators, instructors, facility users, and/or other persons who are providing a service for the users and/or managing the XR platform.

Also provided in FIG. 1 is a user device 106. The user device 106 may be configured as an extended reality headset, personal computer, laptop, tablet, mobile device, and/or other device for providing the XR platform to a user, as well as provide other functionality provided herein. In some embodiments, the user device 106 may be a stand-alone VR headset, while some embodiments may be configured such that the user device 106 couples with a personal computer and/or the facility computing device 104 for providing the XR platform.

As an example, embodiments may be configured to provide an XR platform that can be divided into sub-networks composed of two components: a group, which is a collection of devices (role) and users (role, profile); and a free entity which is a user (role, profile) associated with a free entity device.

Groups are defined by a unique identifier, and may be tied to a business or organization. Each group is a collection of bounded entities, which can be devices and/or users, each coupled with a role that defines the available behaviors of the bounded entity. Additionally, each User has a profile, which stores User specific information including but not limited to accessibility settings and avatar and other experience settings and data. The highest privilege in the group is the administration role. In some embodiments, this role is able to view all bounded entities in the group and facilitate network connections and disconnections between these bounded entities dynamically in real-time. Additionally, administrators and/or certain facility users can whitelist free entities to specific bounded entity users in their group. This allows two users to connect together in a networked instance of the XR platform in a secure manner, preventing uncontrolled and unwanted parties from connecting into a group network.

As an example, an activities director in a senior living facility may be given an administrative role to an XR platform provided by the remote computing device 102. The activities director may be able to connect into the XR platform several older adult individuals living in different housing units belonging to the facility for a conversation in an XR environment (3D modeled forest, 360 video of a real-world setting, etc., as determined by the users and/or administrator). The administrator may be able to coordinate with the individual users ahead of time and create a seamless experience where the users get to meet each other upon connection via their respective user devices 106. Hackers from outside of the facility who would want to connect to the session to impersonate friends/family or simply disrupt a meeting (such as zoombombing) are locked out. Logs of the connections to the session are kept for future security auditing.

It will be understood that free entities are users who are not part of a group. Free entities may be created when a consumer user creates a profile. Free entities can be whitelisted to appear in a list of users under a group, allowing a group administrator to connect a free entity and a bounded entity into a unique networked instance, or the two users to connect themselves. Free entities can be whitelisted to any number of bounded users in any number of groups. Free entities can also be whitelisted to one another through a handshake with the remote computing device 102.

In some embodiments, however, an individual with a user and device that has not been added to any group is unable to connect to any network or sub-network. In order to connect, the individual in these embodiments must follow an authentication process that includes the individual creating a user account; the individual sending an in application request to the group, using a temporary unique ID generated by the group administrator; the administrator for the group approves the request and sends back a security certificate to the device which is stored on the device; and the user application relaunches, the software system notifies the user of available groups to join, and the user selects the recently joined group. The user and device are now listed for the group. The administrator is able to revoke access to the group for a specific user and/or device at any time.

Figure 2:
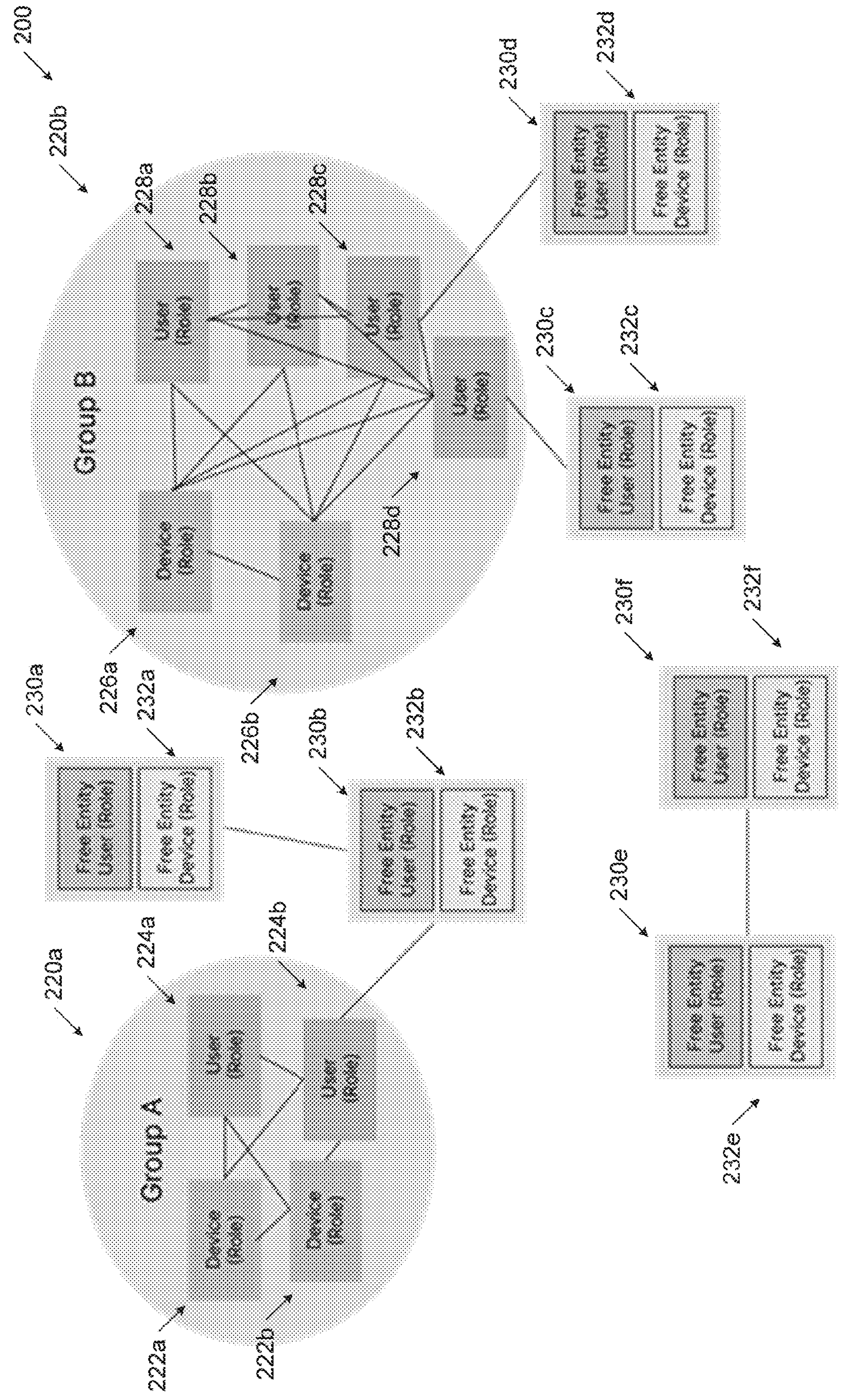
FIG. 2 depicts a relational diagram illustrating user and device organization in facility network, according to embodiments provided herein.

FIG. 2 depicts a relational diagram illustrating user and device organization in a facility network 200, according to embodiments provided herein. As discussed above, embodiments provided herein support various implementations that include the management of a series of patients and care professionals for connections that will be utilized in the XR platform, such as with digital health, digital therapeutics, and telehealth. As such, the data structure of groups may be made up of devices and users, each with roles (privileges). Groups may be secure and inaccessible to other groups by default. The facility computing device 104 may be provided with access to dynamically configure networks of devices in their group, e.g., connect two devices in a networked XR experience. The facility computing device 104 can create open and/or closed activity rooms.

Additionally, the facility computing device 104 may create a whitelist of groups and devices to be accessible. As such, HIPAA compliance may be maintained by not having any identifiable information on the network and/or from restricting the identifiable information (or medical information from everyone but the user to which the data belongs and an approved medical provider).

Some embodiments are configured such that it is impossible for an administrator to connect two users unless the users and the devices connected to those users are devices all in the same group. Additionally, as the connections are logged, logs can be quickly integrated into security reports for auditing purposes. This provides the ability for the administrator to observe at least a portion of an interaction from a third-person perspective in order to assure that an individual user has connected to the desired XR environment and the connections between users are made within the XR environment. This also provides the administrator with the ability to observe if a specific device is on the network in order to help with troubleshooting connections between users in the XR environment.

Administrators may dynamically reconfigure their network by connecting and/or disconnecting users and devices, as well as adding and removing users and devices from the group. Free entities can request a bounded entity user whitelisting that an administrator approves using this interface. The entire system is highly secure (e.g., HIPAA compliant) only exposing users and devices within an administrator's own group, only allowing users to be loaded onto devices in the group, and only allowing users outside of the group to be connected after adding to the group.

As an example, if an administrator creates a group of patients who are subject to post-surgery physical therapy, the administrator may identify devices and users belonging to the therapist leading the session and a specific set of patients assigned to the session. The administrator can create set number of sub-network sessions, each with a specific start and end time. Logs of connections are produced and retained for future security auditing.

Accordingly, referring again to FIG. 2, a facility network 200 may include two primary groups: group A 220 *a* and group B 220 *b*. Each of group A 220 *a* and group B 220 *b* may essentially be secure network infrastructure that only allows authenticated users (224*a* and 224*b*) and devices (222*a* and 222*b*) to belong.

In this instance, the company does not want users from either facility to be able to connect with users from the other facility. Each device in the group may have a security certificate that is used to connect to the correct group, and passes its security certificate to the group for authentication. A user may be added to a group to access a digital health mindfulness class, using any available device that has been authenticated and added to the group. Additionally, a user can be bound to a specific device, or not. users can be added to a group without being bound to a device. An example of this is users in a children's hospital. A lookup table tracks each valid device for a user. users are able to join the default group session, and be added to sub-network sessions, just like any other user.

Users and/or devices may be authenticated via a security certificate (e.g., a first security certificate, a second security certificate, a third security certificate, etc.). Specifically, a determination may be made that a user 224*a* (such as a first user) should be part of a Group 220*a*. The administrator for the group creates a user account. The administrator then adds the new user to any devices in the group the user can use to access the group network. A lookup table is updated for the group with the User+Device associations. Login credentials are provided for the user. The user can now login to a device in the group and will connect to the group network. Once connected, if the user has been added to any sub-network sessions, they many receive a prompt or list to select a sub-network session to join if it is currently active. The administrator is able to remove the user from the group, and/or remove the user from associated devices in the lookup table. Accordingly, no user or device may access the XR environment provided by group A 220*a*, unless they are a User added to the Group, use a device with a security certificate for the group, and upon connection the group identifies that the user is authorized to connect to the group network on the device they are using. Similarly, the user 224*b* may receive authentication and gain access in a similar way. If the user 224*b* is a physician (or other facility user) and the user 224*a* is a patient, however, the user 224*b* may have different privileges than the user 224*a*.

One example includes a user who creates their own profile and is not created as part of a group. This user may request authentication to more than one group, with a security certificate for each group (e.g., a first security certificate, a second security certificate, a third security certificate). If this user requests to be added to a group, during the authentication process their device is saved to the security certification, as well as being saved to the device. This user must then access the group using the authenticated device, and would need to perform another authentication request if using a different device. On example of this scenario is a family who wishes their child to connect with their grandparent that lives in the facility. The family will create a user for their child, and work with the facility administrator to add the user and device to the group. The facility, one example being an activities director, may create a sub-network session for the resident and their grandchild to connect in a safe and secure virtual environment.

One example includes a user 224*a* engaging in an XR therapy session and/or physician consultation with a physician user (user 224*b*). In such an example, both the user 224*a* and the user 224*b* must authenticate with a security certificate, as well as the device identifiers and user identifiers. Since this example only includes the physician and patient, medical information may be communicated freely within the group, while still maintaining security and confidentiality. As such, a medical chart may be freely displayed in the virtual environment. It should be noted, however, that while the administrator may be the only credential that can set up the group and/or XR environment, the administrator (in this example) would not have access to any medical information disclosed in the XR session and/or stored by the physician user. This can be performed either by blocking the administrator from monitoring anything in the XR session or via filtering logic that only allows the administrator to view the presence of the physician user and the patient user; that only allows the administrator to view the presence of only one of the users; that provides auditory redaction of the conversation such that the administrator cannot hear any confidential information, but allows the administrator to hear if one of the users calls "help!"; etc.

Referring back to FIG. 2, free entities may also be able to access the virtual environment, such as free entity user 230*a* (using free entity device 232*a*), a third user, such as free entity user 230*b* (using a third device, such as free entity device 232*b*), free entity user 230*c* (using free entity device 232*c*), free entity user 230*d* (using free entity device 232*d*), free entity user 230*e* (using free entity device 232*e*), and free entity user 230*f* (using free entity device 232*f*). Free entity user 230*a* may register with the XR platform, but since they are not authenticated to access a group, they may not have access group A 220*a* or Group B 220*b*. Specifically, the user may register a user identifier and a device, but may lack the security certificate that allows access to a group. That being said, some free entity users may gain access to a group in limited circumstances. As an example, if the free entity user 230*b* is a physician colleague of the user 224*b*, the user 224*b* may invite the free entity user 230*b* into group A 220*a* to consult with the user 224*a*. While the administrator may have ultimate authority to issue the security certificate to officially invite the free entity user 230*b* into the group a 220*a*, in this embodiment, the administrator could not have the ability to send that security certificate without first receiving approval or a request from the user 224*b*. Once the free entity user 230*b* is admitted, the user 224*b* and/or the user 224*a* may have the ability to eject and/or limit access to information of the free entity user 230*b*.

Group B 220*b* may operate similarly to group A 220*a*, except group B may include more users, thus adding complexity to the authentication process. Specifically, group B may have authenticated device 226*a* and device 226*b*. Group B 220*b* may have also authenticated user 228*a*, user 228*b*, user 228*c*, and user 228*d*. As will be understood, the authenticated device 226*a* and device 226*b* may be community devices that are shared among users. As such, unless additional devices are authenticated into group B 220*b*, not all users could access group B 220*b* at the same time.

Additionally, it should be noted that with the larger number of users in group B 220*b*, further restrictions on data flow may be implemented to maintain confidentiality of sensitive information. As an example, a facility user (such as a group therapy instructor) and/or administrator may have the ability to limit data communications among other users. In such an embodiment, the group therapy instructor may wish to limit communication between two users who do not get along. Depending on the level of filtering desired, the administrator and/or instructor could limit visual data and/or audio data communicated in either direction among the users.

Figure 3:
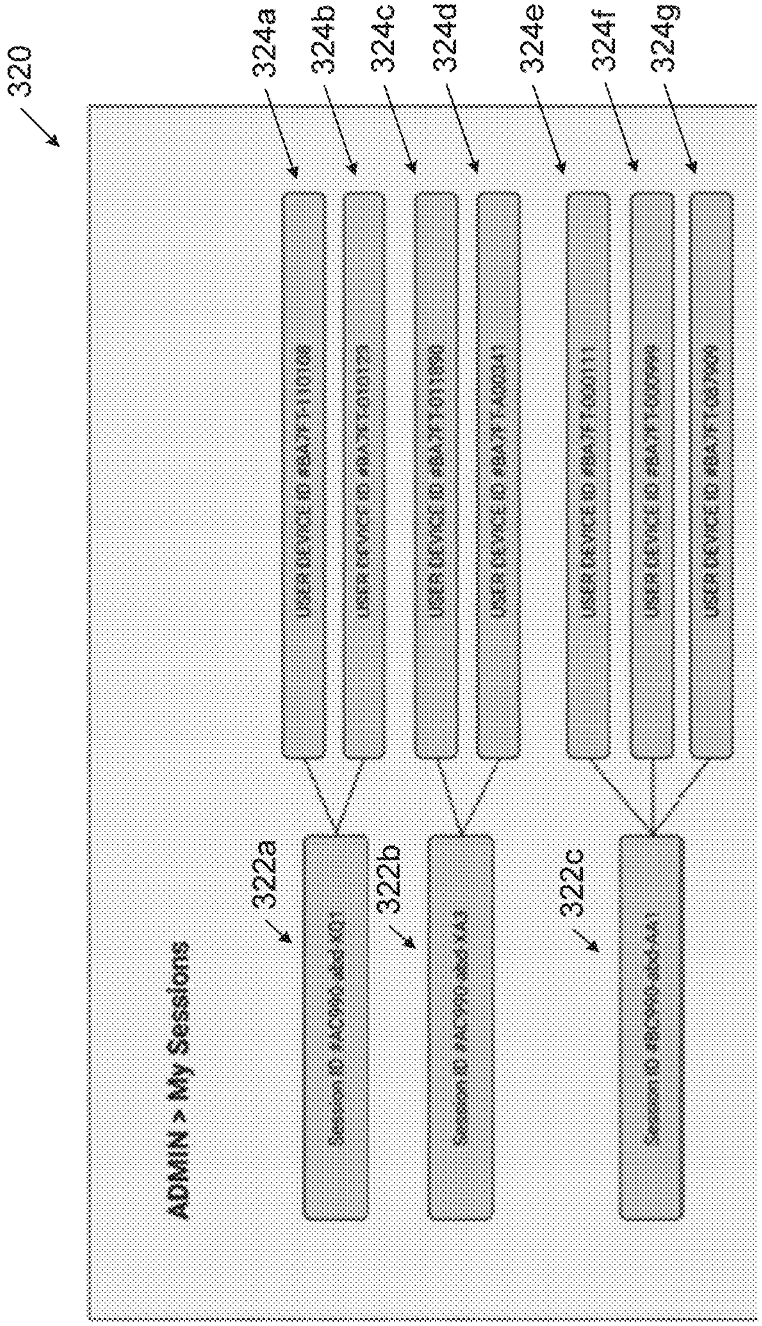
FIG. 3 depicts a user interface illustrating connection functionality within the virtual environment, according to embodiments provided herein.

FIG. 3 depicts a user interface 320 illustrating connection functionality within the virtual environment, according to embodiments provided herein. As illustrated, the user interface 320 may provide a session identifiers for each of a plurality of sessions 322*a*, 322*b*, 322*c* that an administrator oversees. Additionally, the user interface 320 may provide associated user identifiers and/or device identifiers 324*a*-324*g*, with indicators regarding which users and/or devices are associated and/or participating in which sessions.

Figure 4:
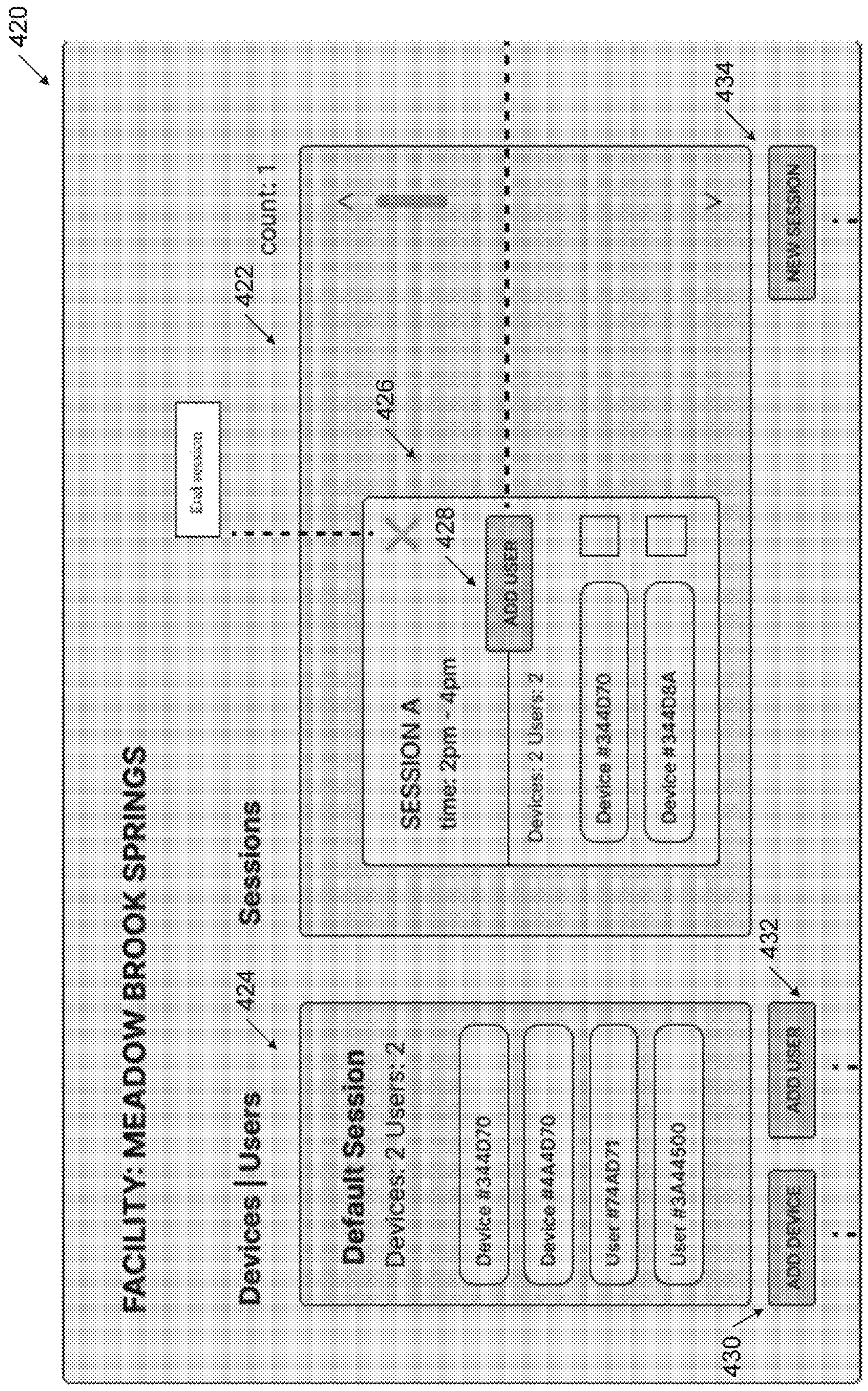
FIG. 4 depicts a user interface providing information related to session status, according to embodiments provided herein.

FIG. 4 depicts a user interface 420 providing information related to session status, according to embodiments provided herein. As illustrated, the user interface 420 may be provided to an administrator to view existing sessions, add new sessions, view devices and users, and add devices and users. Specifically, the user interface 420 includes a sessions section 422 and a device/user section 424. The sessions section 422 provides a listing of current, future, and/or past sessions that are managed by the administrator. Specifically, a session window 426 is provided that depicts the time of the session, and lists devices and/or users that are permitted to participate in the session. Also included is an add user option 428, which allows the administrator to add another user to the session. As discussed above, in some embodiments, the administrator cannot add/invite a new use without a facility user's permission.

Additionally provided in the user interface 420 is the device/user section 424. The device/user section 424 may provide the devices and/or users that the administrator has authenticated for the XR platform and thus could currently be available for inviting to a session. The user interface 420 also provides an add device option 430 for adding a device to the XR platform, as well as an add user option 432 to add a new user. A new session option 434 is provided to create a new session.

Figure 5:
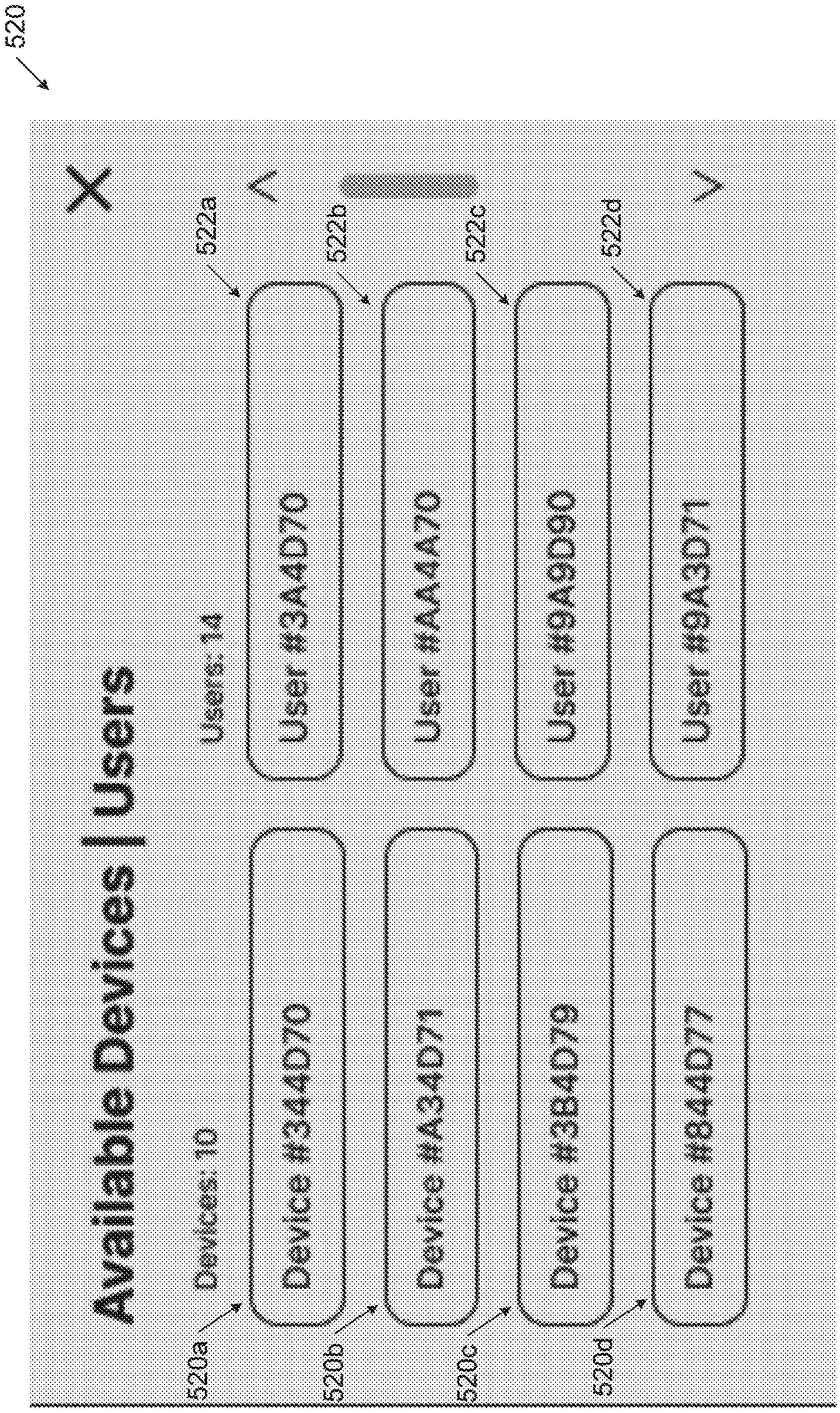
FIG. 5 depicts a user interface providing information related to device status, according to embodiments provided herein.

FIG. 5 depicts a user interface 520 providing information related to device status, according to embodiments provided herein. The user interface 520 may be provided in response to selection of the add user option 428 from FIG. 4. As illustrated, the user interface 520 provides a listing of devices 520*a*-520*d* and/or users 522*a*-522*d* that are available for adding to the selected session. In some embodiments, this list may include any device and/or user that has access to the XR platform, while some embodiments may restrict the list to only those devices and/or users who have been authenticated for this particular session, but have not yet been invited. As an example, if there is a group session, group instruction, group therapy session, etc. on Tuesday and user 522*a* normally attends the same session on Wednesday, that user may be authenticated to attend the Tuesday session, but has not previously been invited.

Figure 6:
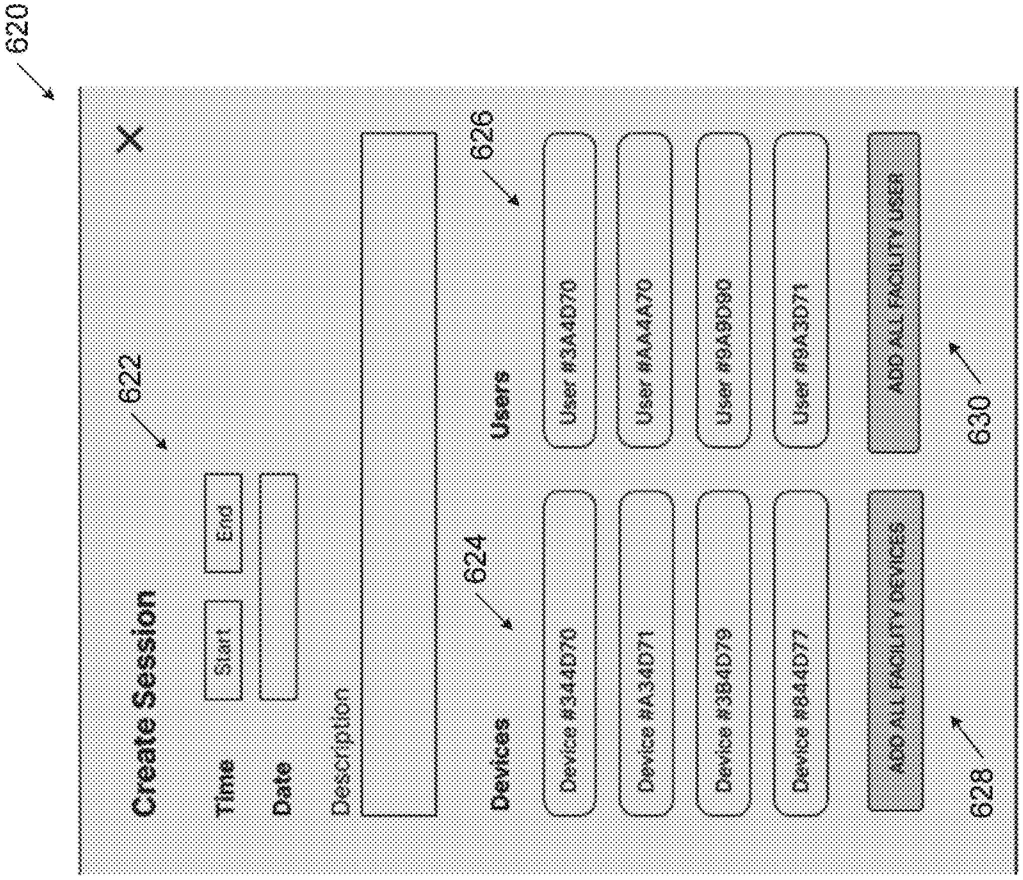
FIG. 6 depicts a user interface for creating a new extended reality session, according to embodiments provided herein.

FIG. 6 depicts a user interface 620 for creating a new extended reality session, according to embodiments provided herein. In response to selection of the create new session option 434 from FIG. 4, the user interface 620 may be provided. As illustrated, the user interface 620 includes a date/time section 622 for the administrator to select a date and/or time for the new session, as well as provide a description of the new session. A devices option 624 may be provided to view, add, edit, and/or delete devices from the new session. A users option 626 may allow the administrator to add, edit, and/or delete users from the new session. An add all facility devices option 628 may be provided for the administrator to add all facility devices to the new session.

An add all facility users option 630 is provided for the administrator to add all facility users to the new session.

Figure 7:
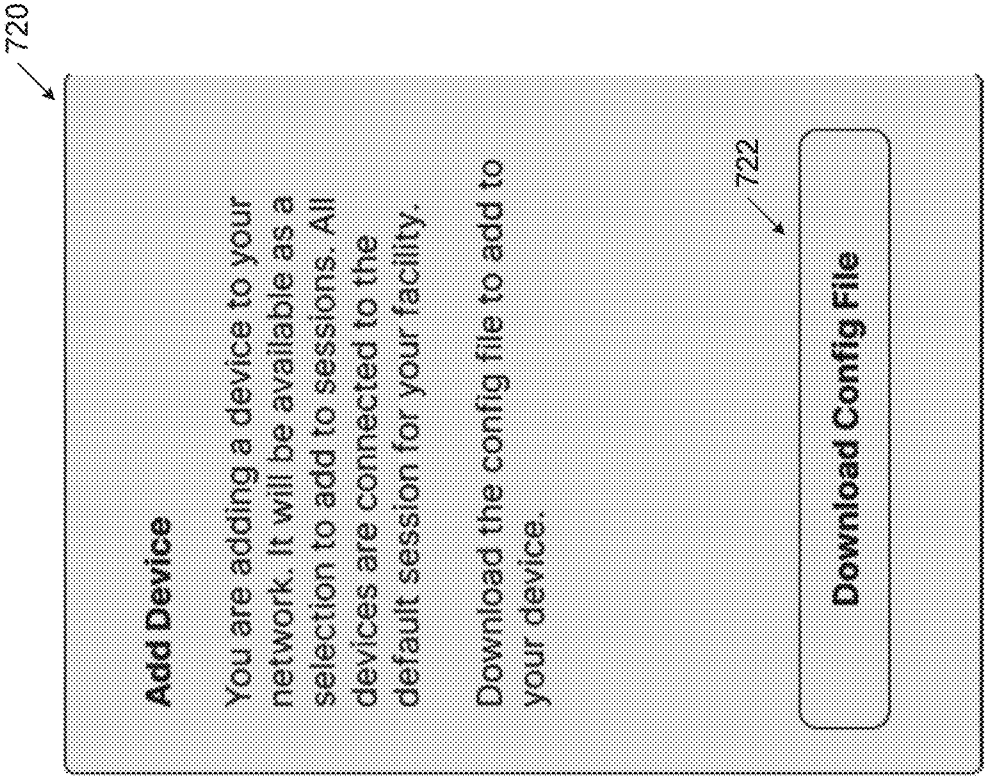
FIG. 7 depicts a user interface for adding a device to a network, according to embodiments provided herein.

FIG. 7 depicts a user interface 720 for adding a device to a network, according to embodiments provided herein. In response to selection of the add device option 430 from FIG. 4, the user interface 720 is provided. As illustrated, the user interface 720 provides a config file option 722, which, in response to selection of the config file option 722, the user may download the security certificate to the device that the user is authenticating.

Figure 8:
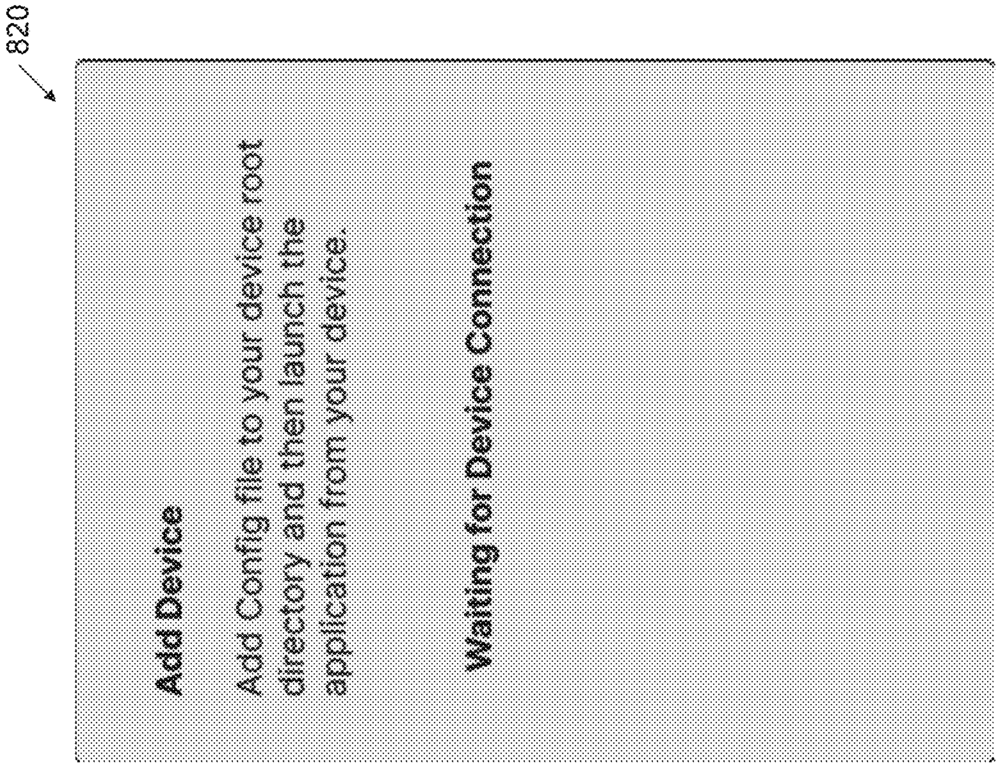
FIG. 8 depicts a user interface for providing details regarding adding a new device to the XR platform, according to embodiments provided herein.

FIG. 8 depicts a user interface 820 for providing details regarding adding a new device to the XR platform, according to embodiments provided herein. In response to downloading a security certificate in FIG. 7, the user interface 820 may be provided. As illustrated, the user interface 820 may provide the user with instructions and/or information regarding adding of the security certificate.

Figure 9:
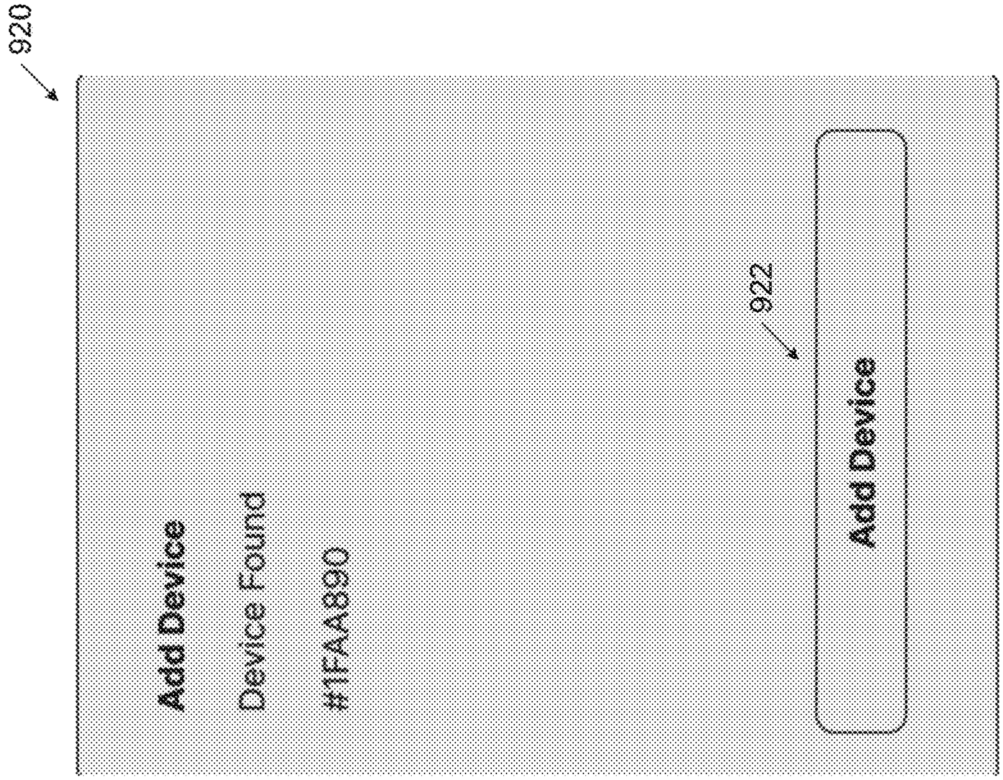
FIG. 9 depicts a user interface for adding a found device to the XR platform, according to embodiments provided herein.

FIG. 9 depicts a user interface 920 for adding a found device to the XR platform, according to embodiments provided herein. As illustrated, the user interface 920 may be provided once the selected device has been found. Also provided is an add device option 922, which downloads the security certificate to that device and registers the device with the XR platform.

It should be noted that one of the security features of this disclosure is the coupling of the security certificate with the device. Specifically, should a user attempt to send the security certificate to another user and/or device, when that user attempts to access the XR platform, there will be a mismatch of the security certificate and device and access will be denied.

Figure 10:
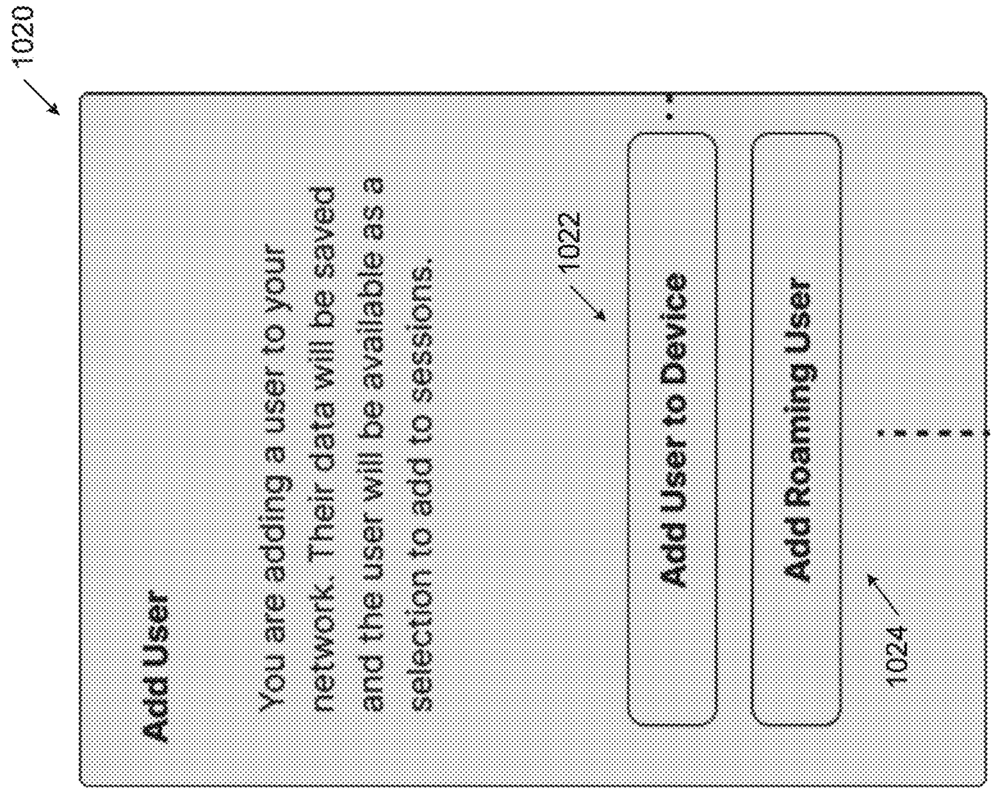
FIG. 10 depicts a user interface for adding a user to a network, according to embodiments provided herein.

FIG. 10 depicts a user interface 1020 for adding a user to a network, according to embodiments provided herein. In response to selection of the add user option 432 from FIG. 4, the user interface 1020 is provided. As illustrated, the user interface 1020 provides an add user to device option 1022 and an add roaming user option 1024. As described in more detail below, in response to selection of the add user to device option 1022, a new user may be added to a registered device. In response to selection of the add roaming user option 1024, options for adding a roaming user may be provided.

Figure 11:
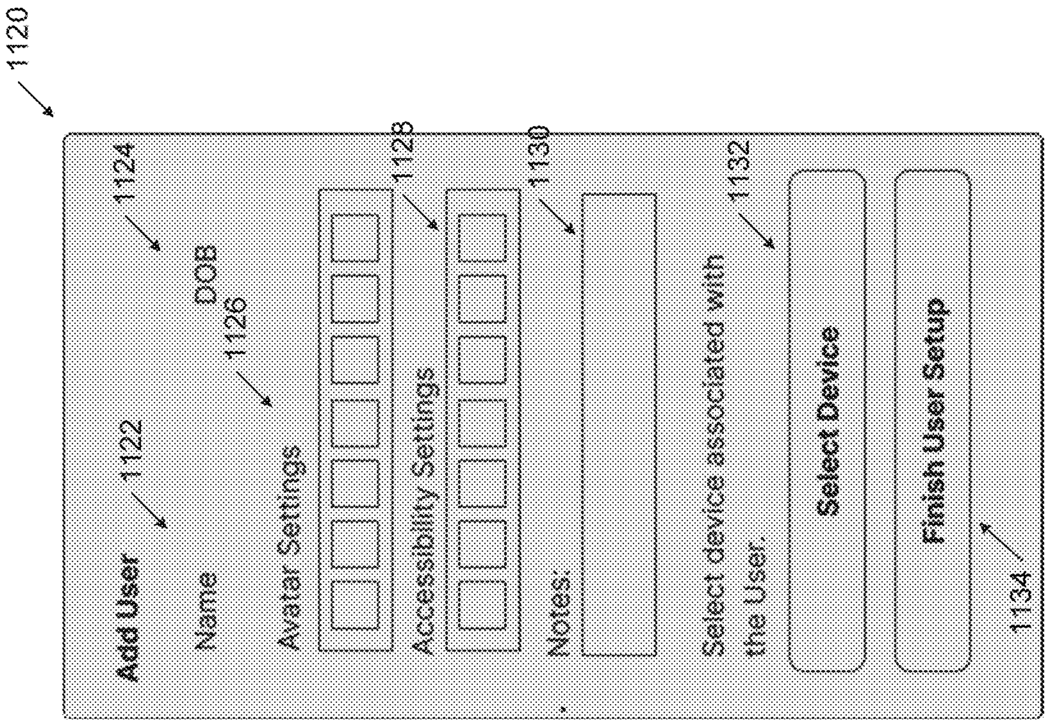
FIG. 11 depicts a user interface for adding a user to a device in an XR platform, according to embodiments provided herein.

FIG. 11 depicts a user interface 1120 for adding a user to a device in an XR platform, according to embodiments provided herein. In response to selection of the add user to device option 1022, the user interface 1120 may be provided. As illustrated, the user interface 1120 provides a name option 1122, a date of birth option 1124, an avatar settings option 1126, an accessibility settings option 1128, a notes option 1130, a select device option 1132, and a finish option 1134.

In response to selection of the name option 1122, the administrator and/or user may add a user name (or user identifier) for the user. In response to selection of the date of birth option 1124, the administrator and/or user may add a date of birth for the user. In response to selection of the avatar settings option 1126, the user and/or administrator may select avatar preferences. As an example, appearance (height, build, hair color, eye color, clothing, etc.) of the avatar may be defined and/or edited. In some embodiments, avatar settings may also include speed, strength, environment tint, etc. In response to selection of the accessibility settings option 1128, the user and/or administrator can define accessibility preferences, such as volume, brightness, vision adjust, font size, language, etc.

In the notes option 1130, notes may be provided regarding special requests, reminders, and/or the like. In response to selection of the select device option 1132, a previously registered device may be selected to link with the user. In response to selection of the finish option 1134, the user profile may be completed.

Figure 12:
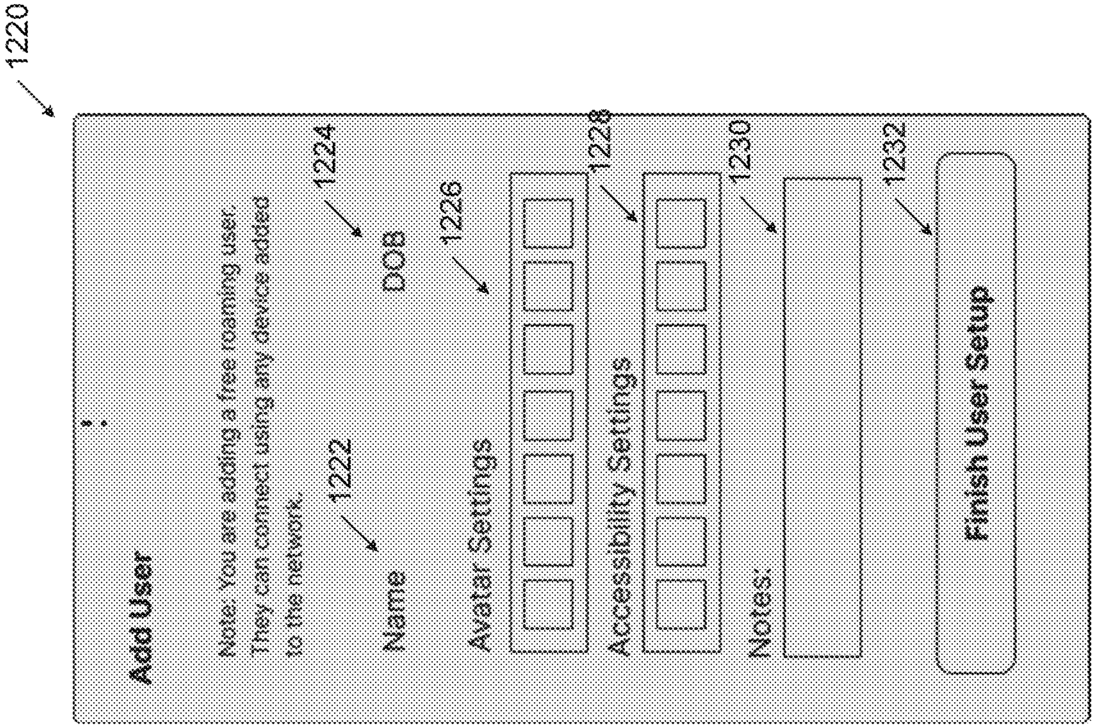
FIG. 12 depicts a user interface for adding a roaming user to an XR platform, according to embodiments provided herein

FIG. 12 depicts a user interface 1220 for adding a roaming user to an XR platform, according to embodiments provided herein. In response to selection of the add roaming user option 1024, the user interface 1220 may be provided. As illustrated, the user interface 1220 includes a name option 1222, a date of birth option 1224, an avatar settings option 1226, an accessibility settings option 1228, a notes option 1230 and a finish option 1232.

Similar to the options provided in the user interface 1120 from FIG. 11, the options provided in the user interface 1220 correspond with similar features. The primary difference being that there is no option to link the user with a device, since the user may use one of many devices. It should be noted that this might limit accessibility of the user to certain groups, as the added level of security may not be available. In some embodiments, a user may be linked with a plurality of authenticated devices to maintain the security but provide flexibility to the user.

Figure 13:
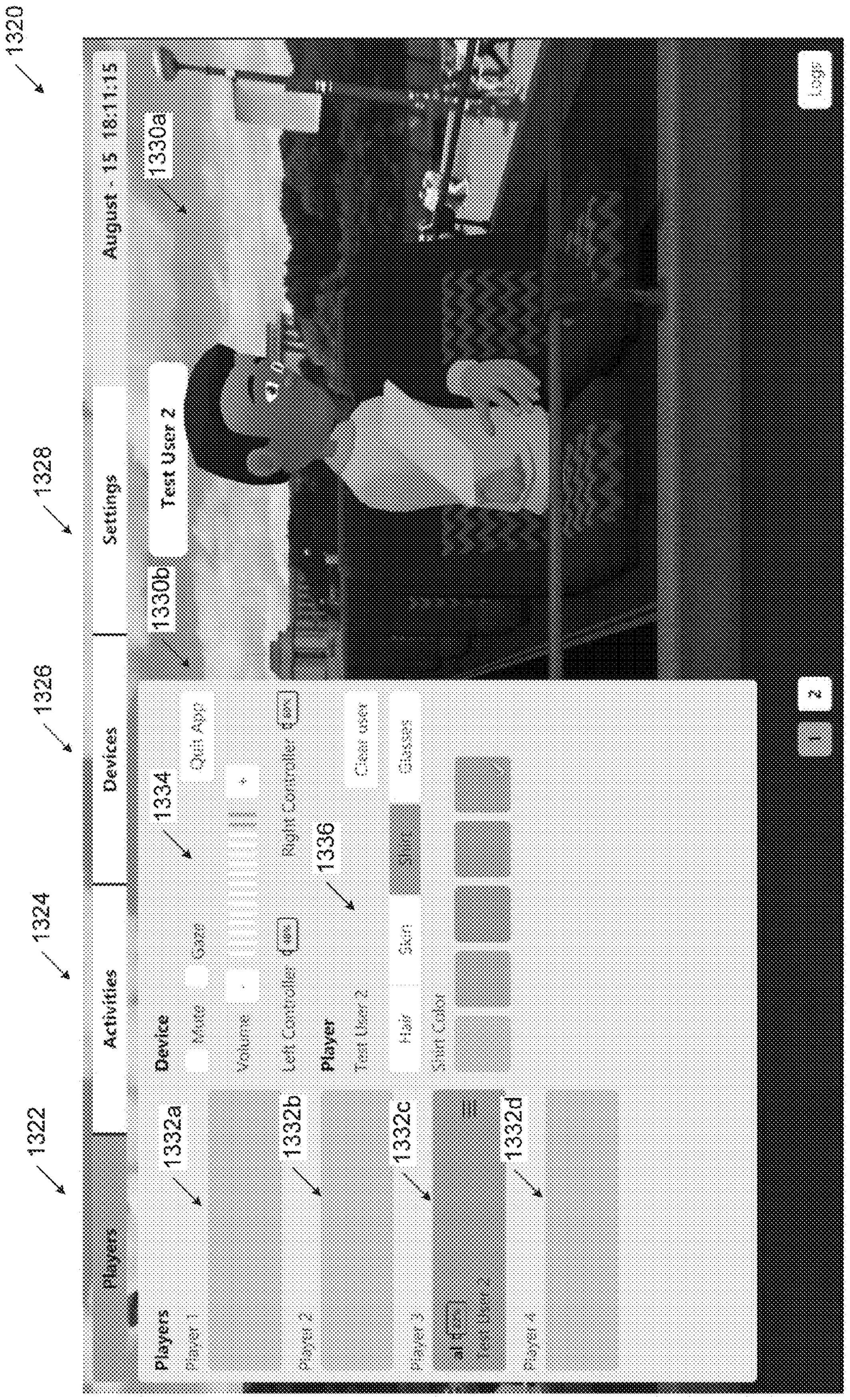
FIG. 13 depicts an XR interface for providing an XR environment, as well as options associated therewith, according to embodiments provided herein.

FIG. 13 depicts an XR interface 1320 for providing an XR environment, as well as options associated therewith, according to embodiments provided herein. As illustrated, the XR interface 1320 provides a players option 1322, an activities option 1324, a devices option 1326, and a settings option 1328. The XR interface 1320 also provides an XR environment 1330*a* for the users of the group to experience. As the XR environment is completely customizable, various options may be provided to deliver the desired experience for the particular group.

Additionally, in response to selection of the players option 1332, a players window 1330*b* may be provided. The players window 1330*b* may include players options 1332*a*, 1332*b*, 1332*c*, and 1332*d* (as well as additional or fewer options, depending on the number of users participating). The players options may be automatically populated based on the presence of the authenticated users. A device section 1334 may also be provided to provide options related to one or more of the users' device, such as mute, gaze, volume, etc. A player section 1336 may provide options to further adjust and/or customize the avatar.

Figure 14:
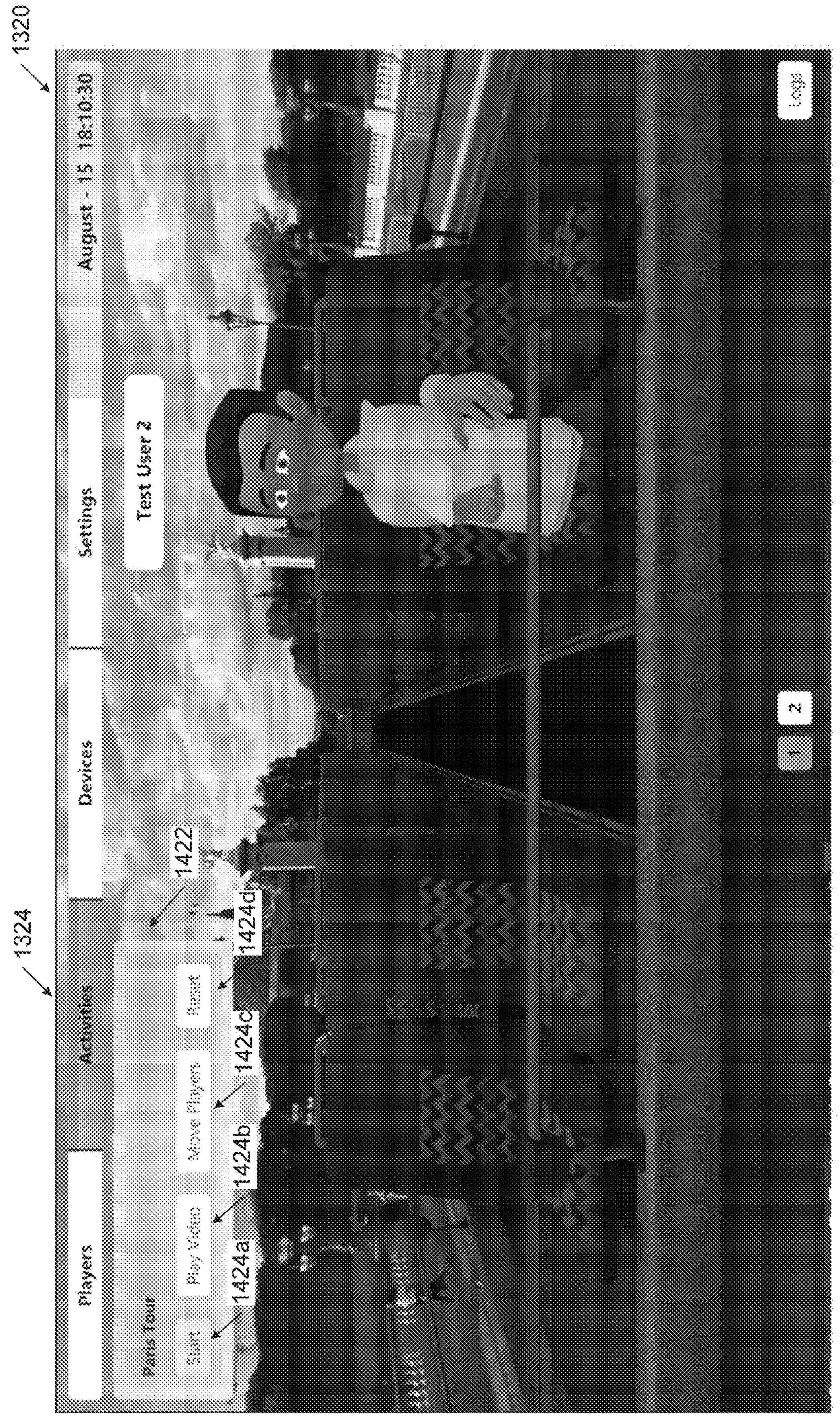
FIG. 14 depicts an XR interface for setting up activities in an XR environment, according to embodiments provided herein.

FIG. 14 depicts an XR interface 1320 for setting up activities in an XR environment, according to embodiments provided herein. As illustrated, in response to selection of the activities option 1324 in the XR interface 1320, an activities window 1422 may be provided. In the example of FIG. 14, the activities window includes a Paris tour, with a start option 1424*a*, a play video option 1424 *b*, a move player option 1424 *c* and a reset option 1424 *d*.

Figure 15:
FIG. 15 depicts an XR interface for setting up additional activities in an XR environment, according to embodiments provided herein.

FIG. 15 depicts an XR interface 1320 for setting up additional activities in an XR environment, according to embodiments provided herein. Similar to the example from FIG. 14, in response to selection of the activities option 1324, other venue options may be provided, such as a Louvre option 1522 *a*, a Paris Art Café option 1522 *b*, and/or other options that may or may not be in France. For the Louvre, a start option 1524 *a*, a play video option 1524 *b*, a move players option 1524 *c*, and a reset option 1524 *d* may be provided. For the Paris Art Café, a start option 1526 *a*, a previous option 1526*b*, a next option 1526 *c*, and a reset option 1526 *d* may be provided. Additionally, an autoplay option 1528*a* and a loop option 1528*b* may be provided.

Figure 16:
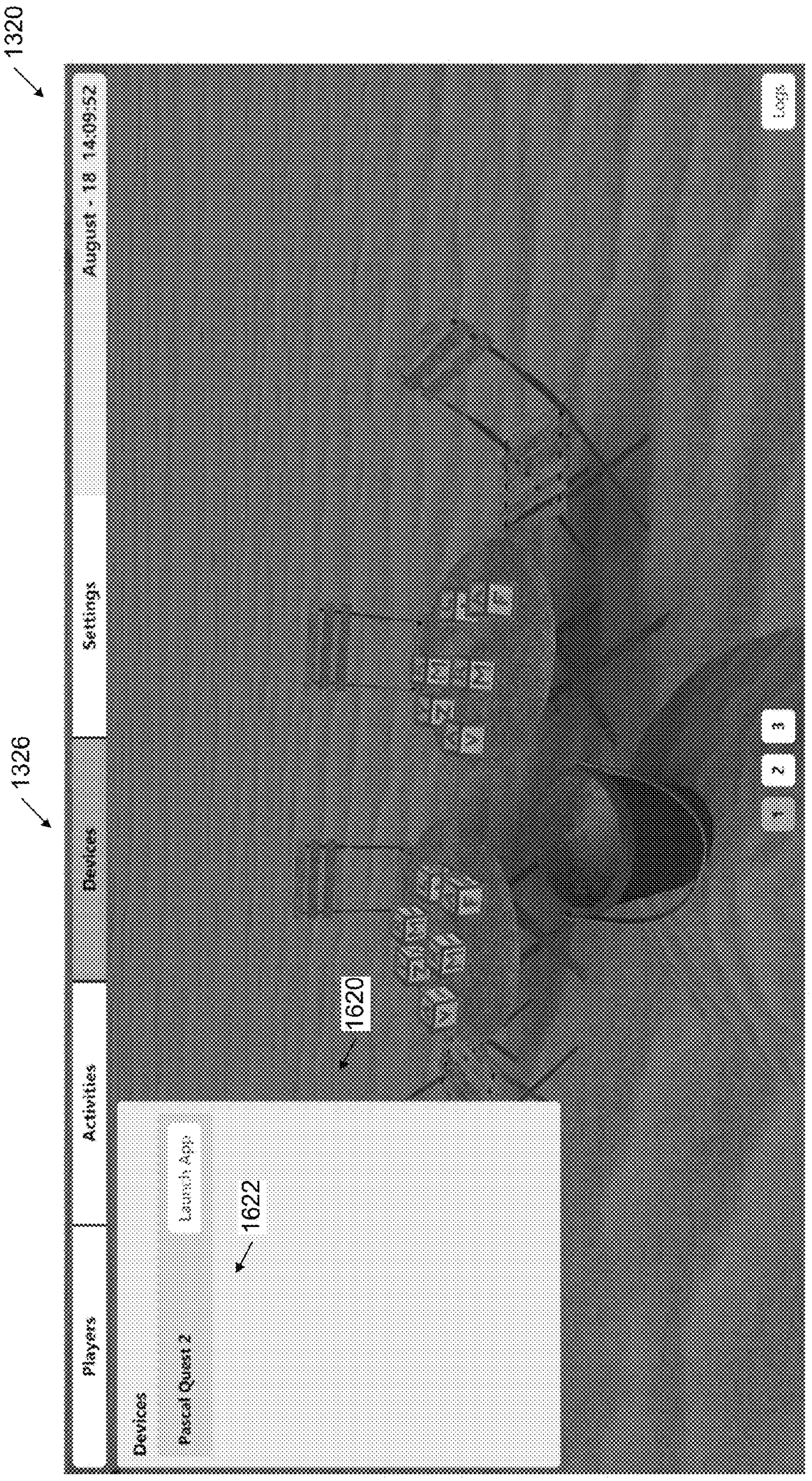
FIG. 16 depicts an XR interface for determining devices that will participate in the XR environment, according to embodiments provided herein.

FIG. 16 depicts an XR interface 1320 for determining devices that will participate in the XR environment, according to embodiments provided herein. As illustrated, in response to selection of the devices option 1326, a list 1620 of connected devices 1622 may be provided.

Figure 17:
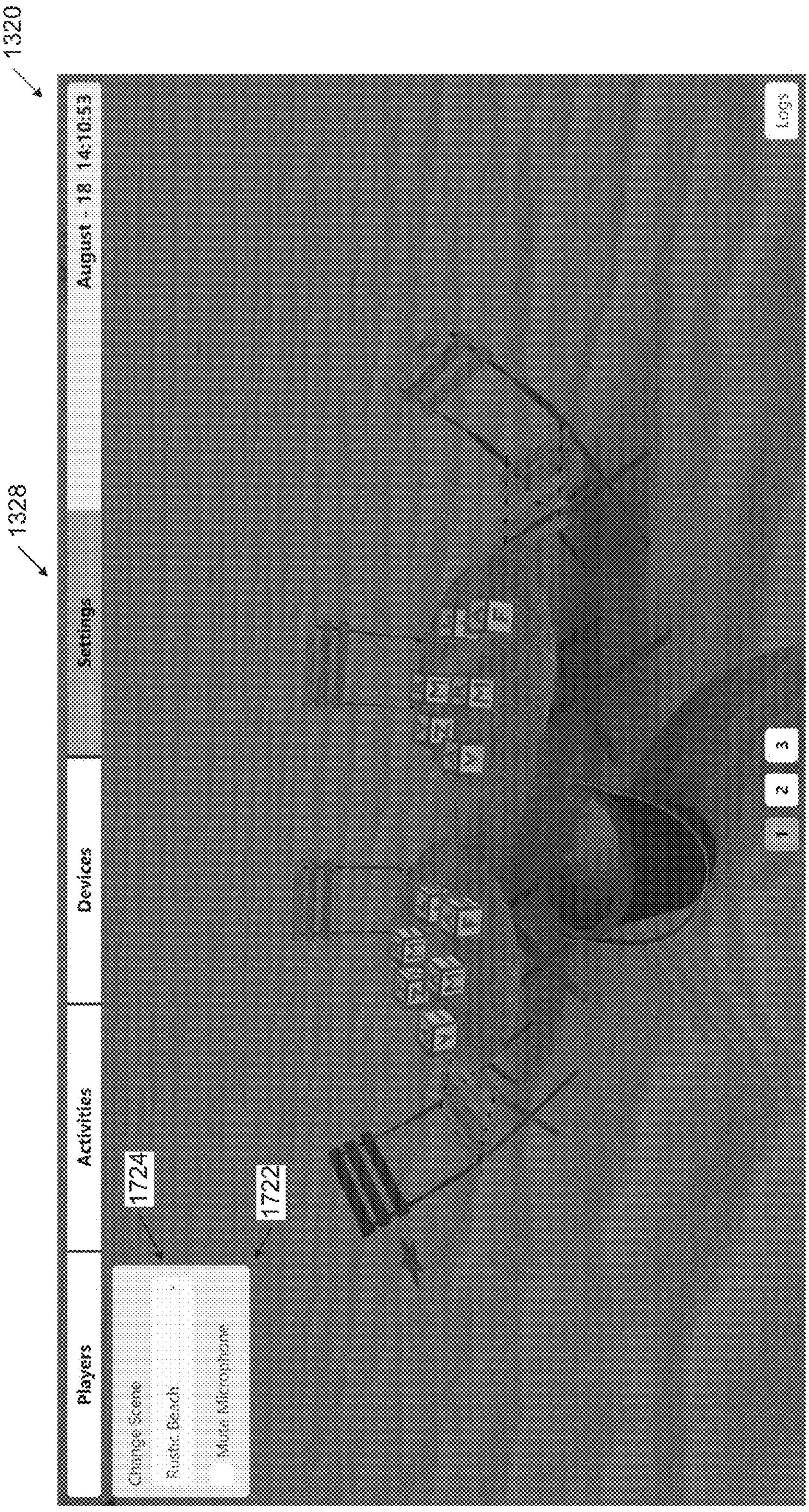
FIG. 17 depicts an XR interface for modifying settings for the XR environment, according to embodiments provided herein.

FIG. 17 depicts an XR interface 1320 for modifying settings for the XR environment, according to embodiments provided herein. As illustrated, in response to selection of the settings option 1328, a settings window 1722 may be provided with a change scene option 1724 and/or other options may be provided.

Figure 18:
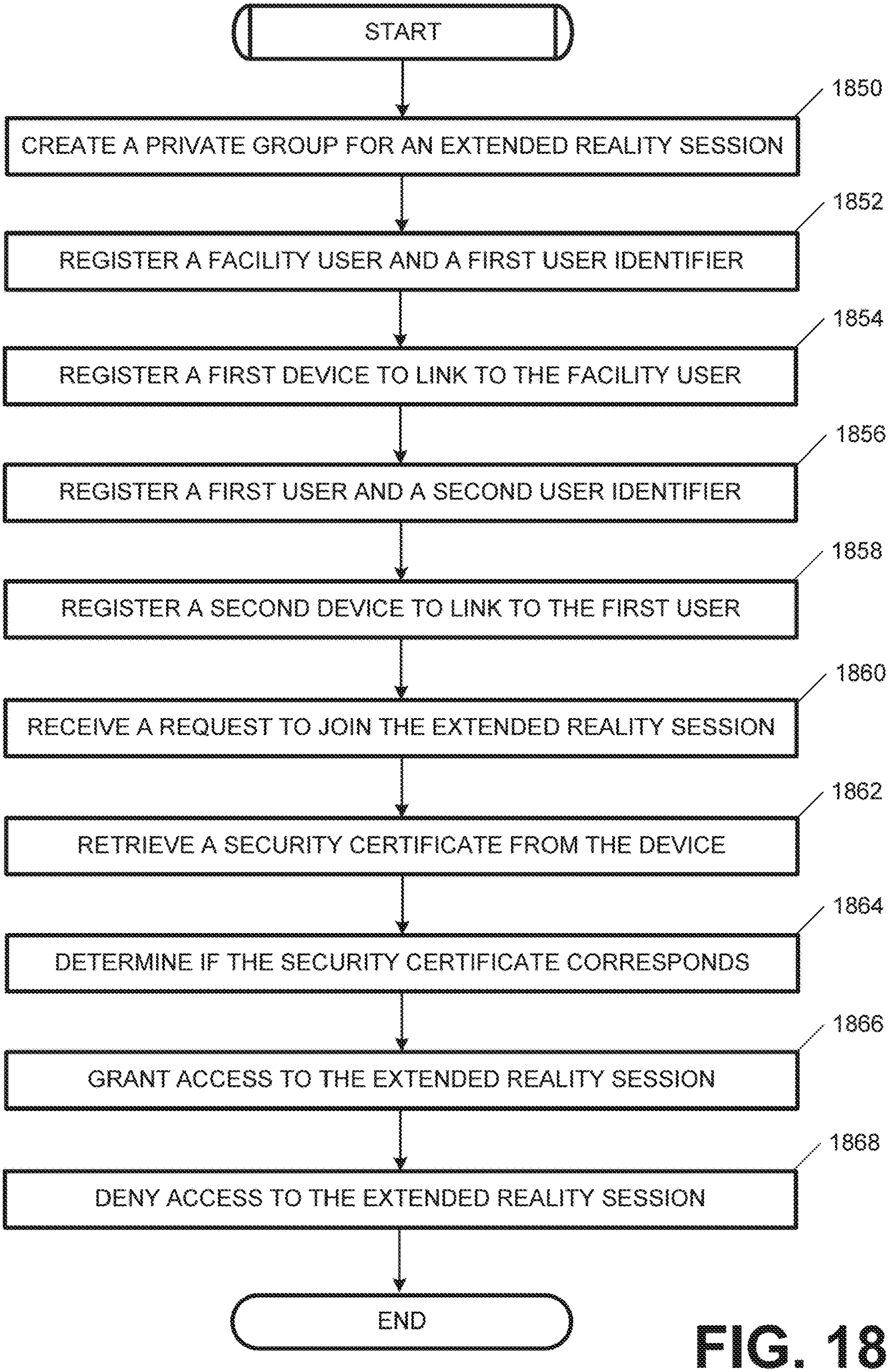
FIG. 18 depicts a flowchart for connecting users in an extended reality setting, according to embodiments provided herein.

FIG. 18 depicts a flowchart for connecting users in an extended reality setting, according to embodiments provided herein. As illustrated in block 1850, a private group may be created for an extended reality session. In block 1852, a facility user may be registered for the group and a first user identifier may be registered for the facility user. In block 1854, a first device may be registered to link to the facility user, where registering the first device includes creating a first security certificate with an identifier of the private group to be stored at the first device. In block 1856, a first user may be registered for the private group and a second user identifier may be registered for the first user. In block 1858, a second device may be registered to link to the first user, where registering the second device includes creating a second security certificate with the identifier of the private group to be stored at the second device. In block 1860, a request may be received from a device of a possible user to join the extended reality session. In block 1862, a security certificate may be retrieved from the device.

In block 1864, a determination may be made regarding whether the security certificate corresponds with at least one of the following: the first security certificate or the second security certificate, whether the possible user corresponds with the at least one of the following: the facility user or the first user, and whether the device corresponds to at least one of the following: the first device or the second device. In block 1866, in response to determining that the security certificate corresponds with the first security certificate, the possible user corresponds to the facility user and the device corresponds to the first device or the security certificate corresponds with the second security certificate, the possible user corresponds to the first user and the device corresponds to the second device, access may be granted to the possible user to the extended reality session. In block 1868, in response to determining that the security certificate does not correspond to the first security certificate, the possible user does not correspond to the facility user, or the device does not correspond to the first device, or the security certificate does not correspond to the second security certificate, the possible user does not correspond to the first user, or the device does not correspond to the second device, access to the possible user to the extended reality session may be denied.

Figure 19:
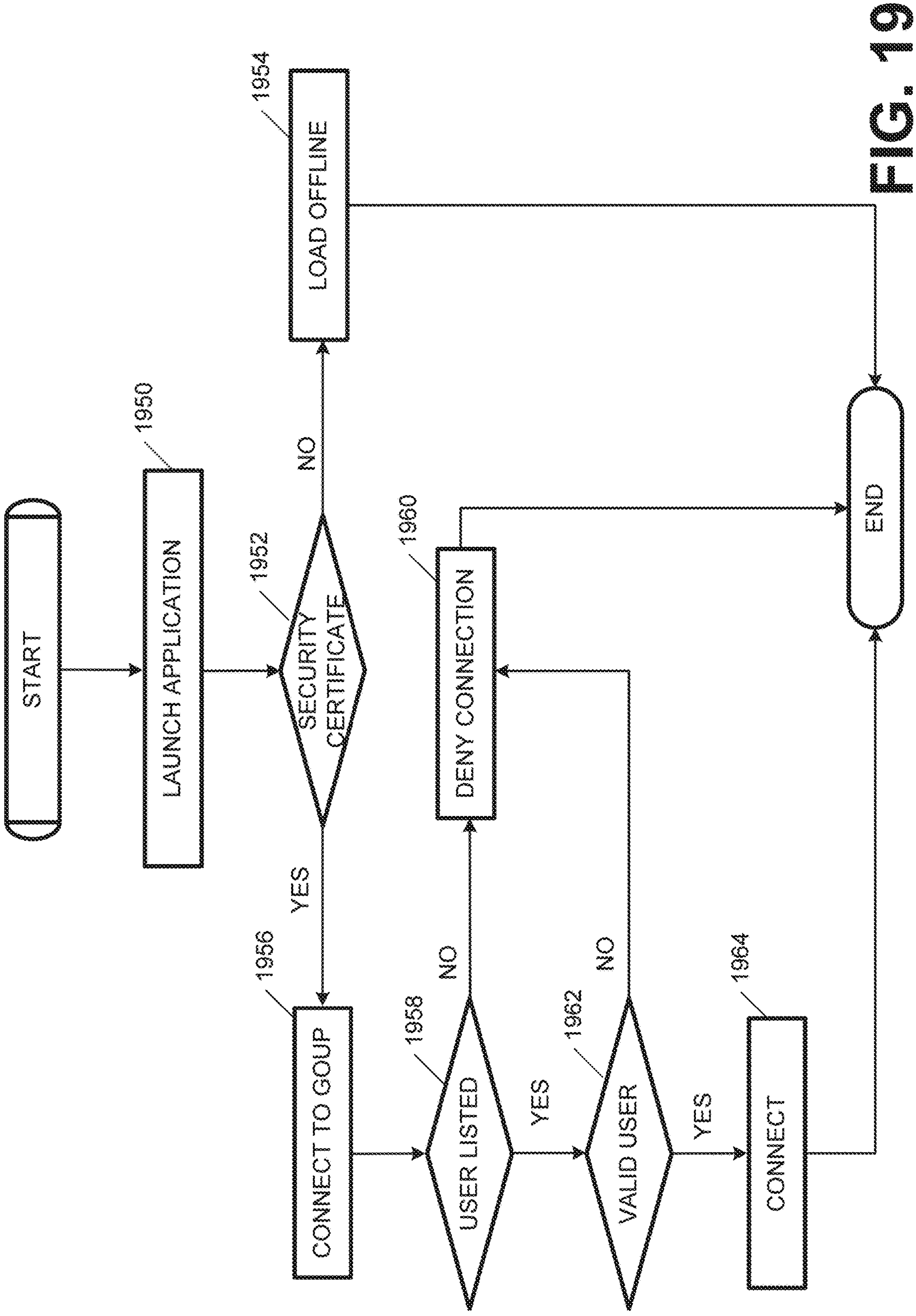
FIG. 19 depicts a flowchart for connecting to a group in an extended reality setting, according to embodiments provided herein.

FIG. 19 depicts a flowchart for connecting to a group in an extended reality setting, according to embodiments provided herein. As illustrated in block 1950, the application may be launched. In block 1952, a determination may be made regarding whether a valid security certificate is present on the device. If there is not valid security certificate, the process may proceed to block 1954, where an offline experience is provided. If a valid security certificate is provided, in block 1956 an attempt is made to connect to the group identified in the security certificate. In block 1958, a determination is made regarding whether the associated user is listed as part of the group. If not, at block 1960, the connection to the group is denied. If the user is listed, at block 1962, a determination is made regarding whether the user is a valid user. If not, the process returns to block 1960 to deny the connection to the group. If the user is valid at block 1962, the connection is completed at 1964.

Figure 20:
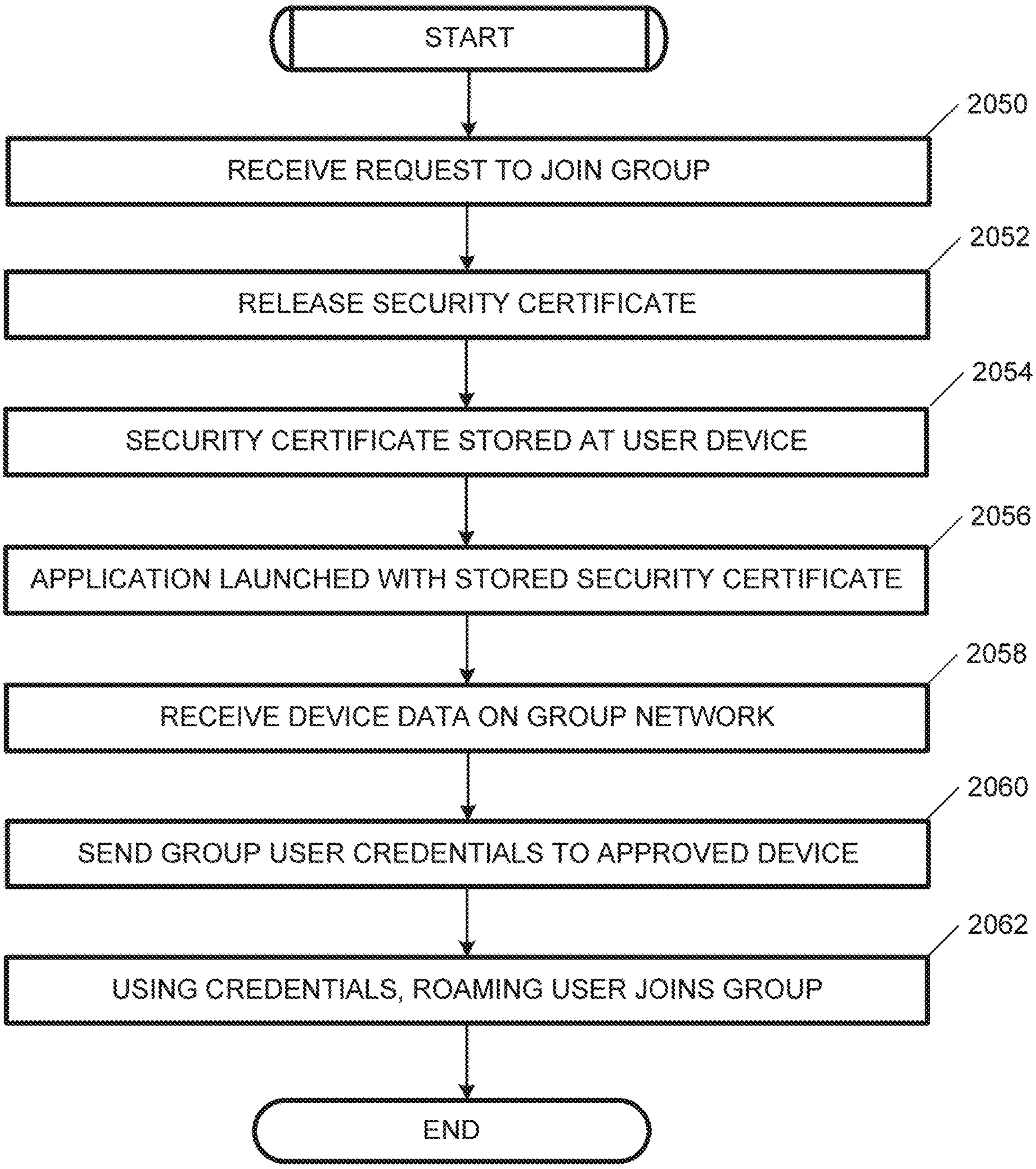
FIG. 20 depicts a flowchart for registering a user with a group network, according to embodiments provided herein.

FIG. 20 depicts a flowchart for registering a user with a group network, according to embodiments provided herein. As illustrated in block 2050, a request to join a group may be received. The request may be received from a roaming user, who is outside of the group. The request may be received as an in-application request. The requests may be reviewed by an administrator and/or the remote computing device 102. If the request is approved, in block 2052, the remote computing device 102 may release a security certificate to the user device 106. In block 2054, the security certificate may be received and stored by the user device 106. In block 2056, the user device may launch the application, which accesses the security certificate. In block 2058, the remote computing device 102 may receive data related to the group network with the user device 106 associated therewith. In block 2060, group user credentials may be sent to the user device, which has been approved. In block 2062, using the received credentials, the roaming user may be permitted to join the group.

Figure 21:
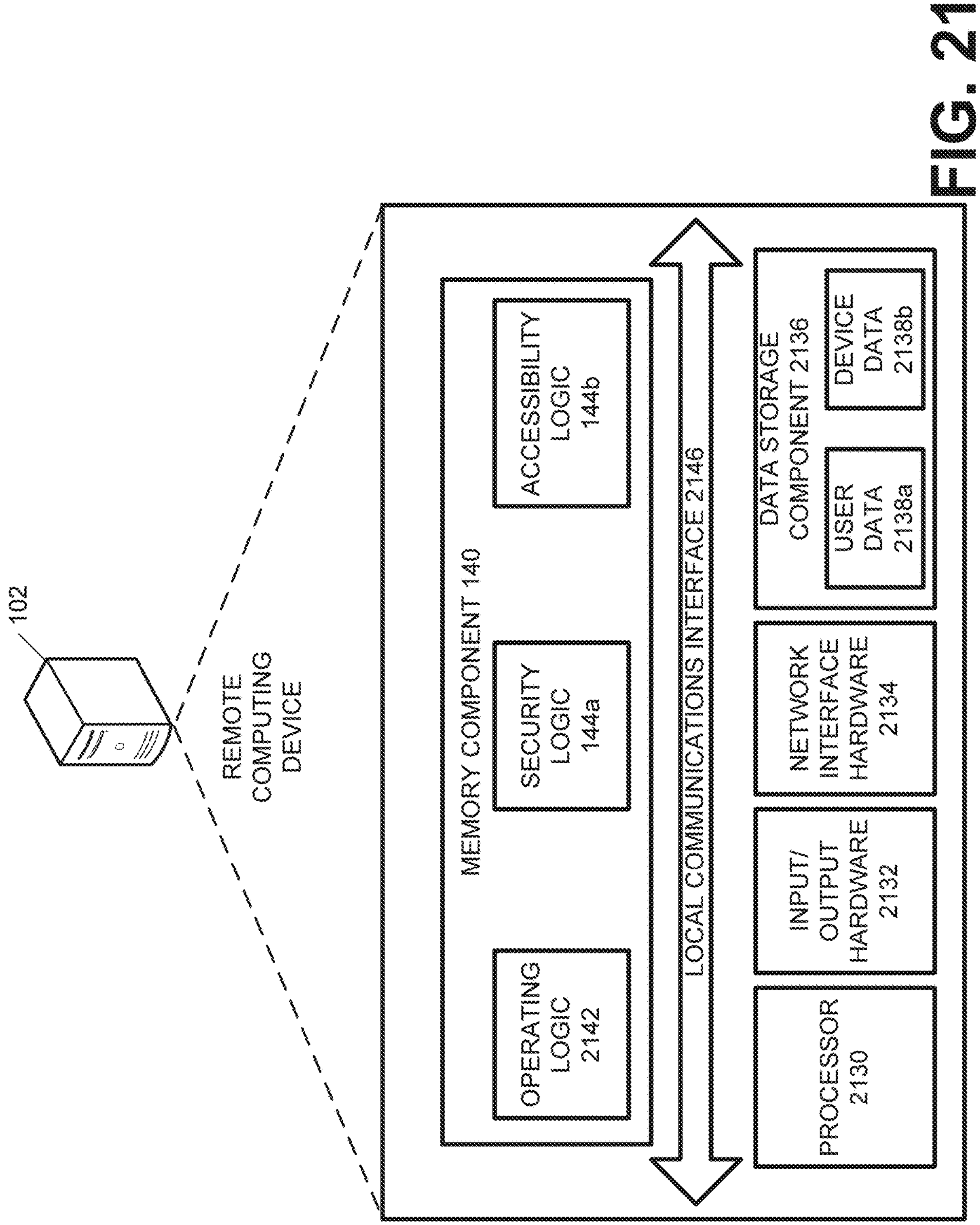
FIG. 21 depicts a computing device for connecting users in an extended reality setting, according to embodiments provided herein.

FIG. 21 depicts a remote computing device 102 for connecting users in an extended reality setting, according to embodiments provided herein. As illustrated, the remote computing device 102 includes a processor 2130, input/output hardware 2132, a network interface hardware 2134, a data storage component 2136 (which stores user data **2138*a*, device data 2138*b*, security certificate data, XR platform data, and/or other data as described above), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the remote computing device 102 and/or external to the remote computing device 102**.

The memory component 140 may store operating logic 2142, the security logic **144*a*, and the accessibility logic 144*b*. Each of these logic components may include a plurality of different pieces of logic, each of which may be embodied as a computer program, firmware, and/or hardware, as an example. A local communication interface 2146 is also included in FIG. 21 and may be implemented as a bus or other communication interface to facilitate communication among the components of the remote computing device 102**.

The processor 2130 may include any processing component operable to receive and execute instructions (such as from a data storage component 2136 and/or the memory component 140). As described above, the input/output hardware 2132 may include and/or be configured to interface with speakers, microphones, and/or other input/output components.

The network interface hardware 2134 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 102 and other computing devices.

The operating logic 2142 may include an operating system and/or other software for managing components of the remote computing device 102. As discussed above, the security logic 144*a* may reside in the memory component 140 and may be configured to cause the processor 2130 to store and initiate security protocols, as described herein. The accessibility logic 144*b* may be configured for causing a computing device to generate an XR environment and/or session, as well as provide options and features related thereto.

It should be understood that while the components in FIG. 21 are illustrated as residing within the remote computing device 102, this is merely an example. In some embodiments, one or more of the components may reside external to the remote computing device 102 or within other devices, such as the facility computing device 104 and/or the user device 106 depicted in FIG. 1. It should also be understood that, while the remote computing device 102 is illustrated as a single device, this is also merely an example. In some embodiments, the security logic 144*a* and the accessibility logic 144*b* may reside on different computing devices.

As an example, one or more of the functionalities and/or components described herein may be provided by the remote computing device 102 and/or the facility computing device 104. Depending on the particular embodiment, any of these devices may have similar components as those depicted in FIG. 21. To this end, any of these devices may include logic for performing the functionality described herein.

Additionally, while the remote computing device 102 is illustrated with the security logic 144*a* and the accessibility logic 144*b* as separate logical components, this is also an example. In some embodiments, a single piece of logic may provide the described functionality. It should also be understood that while the security logic 144*a* and the accessibility logic 144*b* are described herein as the logical components, this is also an example. Other components may also be included, depending on the embodiment.

As illustrated above, various embodiments for connecting users in an extended reality setting are disclosed. These embodiments provide an XR environment and, more generally, a communications environment that limits access to certain user/device combinations, thereby creating a secure platform suitable for digital health and digital therapeutics treatment. education, and intervention delivery, virtual medical consultations and other private virtual human interactions. By limiting access, this works counter to most open platforms, which encourage larger groups of people to communicate.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein. Additionally, embodiments provided herein are configured to improve XR and computing technology by creating a versatile, secure platform for communicating sensitive data between authenticated (or bounded) users.

Additionally, embodiments described herein provide a connection for users by a trusted third party, with an interface to manage connections and create new connections that obfuscate user data at the database level, yet enables a trusted third party to manage the connection network for a specific facility, group, etc. in a safe, secure, and compliant manner. Some embodiments also generate reports for regulatory agencies. Some embodiments provide multiple security measures that prevent an unwanted user or device access to an XR session. A multi-step process may be implemented to register a user and/or device to a group, and only users and devices added to a group can connect together in a networked session. Some embodiments provide an interface for an administrator to manage and monitor users and devices for additional security and functionality. Further still, some embodiments do not allow administrators to add users and devices outside of a group to a session by not having these devices and users available in the system, adding an additional layer of security by avoiding user error during the creation of a session. In some embodiments, administrators do not have access to monitor a session without an extra level of permission, maintaining privacy of users in a session in such a situation as a group therapy session lead by a licensed psychologist whose user role does allow monitoring users and removing them if necessary. Further, group user and device information may be encrypted and obfuscated, maintaining privacy and compliance of all groups while still offering the ability to create and destroy groups, as well as troubleshoot issues by group administrators. Some embodiments provide a unique flow to adding a new user to a group that has multiple levels of security.

In addition, embodiments can be used for delivery of digital therapeutics to vulnerable populations. These include but are not limited to software as a medical device (SaMD) technologies.

It should now be understood that embodiments disclosed herein include systems, methods, and non-transitory computer-readable mediums for connecting users in an extended reality setting. It should also be understood that these embodiments are merely exemplary and are not intended to limit the scope of this disclosure.

What is claimed is:

1. A method for connecting users in an extended reality setting, the method comprising:

creating, by a client application, a group identifier for an extended reality session, wherein the client application is accessed by an administrator user via an administrator device;

registering, by the client application, the administrator user for the group using an administrator identifier;

registering, by the client application, the administrator device to associate with the administrator identifier, wherein registering the administrator device includes creating an administrator security certificate using the group identifier for the group, and wherein the administrator security certificate is to be stored at the administrator device;

registering, by the client application, a first user for the group using a first user identifier for the first user;

registering, by the client application, a first computing device to associate with the first user identifier, wherein registering the first computing device includes creating a first security certificate using the group identifier for the private group, and wherein the first security certificate is to be stored at the first computing device;

receiving, by the client application, a request for a second user to join the extended reality session being accessed by the first user via first computing device, wherein the request is received from a second computing device associated with the second user;

receiving, by the client application, a second security certificate from the second computing device;

determining, by the client application and based on the second security certificate, whether to grant the second user access to the extended reality session via the second computing device;

wherein determining whether to grant the second computing device access to the extended reality session includes determining whether the second security certificate corresponds to the administrator security certificate or the first security certificate; and causing, by the client application and based on the second security certificate, the second computing device to connect to the extended reality session being accessed by the first computing device, wherein virtual interactions between the first user and the second user are facilitated by the first computing device and the second computing device being connected to the extended reality session.

2. The method of claim 1, wherein the administrator device, the first computing device, and the second computing device are separate devices.

3. The method of claim 2, further comprising:

causing, by the client application, a modality of communication during the virtual interactions between the first user and the second user to be restricted.

4. The method of claim 2, wherein a third user is accessing the extended reality session via a third computing device, and the method further comprises:

causing, by the client application, the third computing device to be restricted from receiving user input of the first user to the first computing device.

5. The method of claim 4, wherein the user input includes an audio input that corresponds to a spoken input from the first user to an audio interface of the first computing device.

6. The method of claim 5, further comprising:

causing, based on the second security certificate, the third computing device to receive other input from the second user to the second computing device.

7. The method of claim 1, wherein the client application restricts the third computing device from receiving user input of the first user to the first computing device based on the first security certificate from the first computing device.

8. A system for connecting users in an extended reality setting, the system comprising:

one or more computing devices performing at least the following operations:

creating, by a client application, a group identifier for an extended reality session, wherein the client application is accessed by an administrator user via an administrator device;

registering, by the client application, the administrator user for the group using an administrator identifier;

registering, by the client application, the administrator device to associate with the administrator identifier wherein registering the administrator device includes creating an administrator security certificate using the group identifier for the group, and wherein the administrator security certificate is to be stored at the administrator device;

registering, by the client application, a first user for the group using a first user identifier for the first user;

registering, by the client application, a first computing device to associate with the first user identifier, wherein registering the first computing device includes creating a first security certificate using the group identifier for the group, and wherein the first security certificate is to be stored at the first computing device;

receiving, by the client application, a request for a second user to join the extended reality session being accessed by the first user via first computing device, wherein the request is received from a second computing device associated with the second user;

receiving, by the client application, a second security certificate from the second computing device;

determining, by the client application and based on the second security certificate, whether to grant the second user access to the extended reality session via the second computing device, wherein determining whether to grant the second computing device access to the extended reality session includes determining whether the second security certificate corresponds to the administrator security certificate or the first security certificate; and causing, by the client application and based on the second security certificate, the second computing device to connect to the extended reality session being accessed by the first computing device, wherein virtual interactions between the first user and the second user are facilitated by the first computing device and the second computing device being connected to the extended reality session.

9. The system of claim 8, wherein the administrator device, the first computing device, and the second computing device are separate devices.

10. The system of claim 9, wherein the operations further include:

causing, by the client application, a modality of communication during the virtual interactions between the first user and the second user to be restricted.

11. The system of claim 9, wherein a third user is accessing the extended reality session via a third computing device, and the operations further include:

causing, by the client application, the third computing device to be restricted from receiving user input of the first user to the first computing device.

12. The system of claim 11, wherein the user input includes an audio input that corresponds to a spoken input from the first user to an audio interface of the first computing device.

13. The system of claim 12, wherein the operations further include causing, based on the second security certificate, the third computing device to receive other input from the second user to the second computing device.

14. The system of claim 13, wherein the client application restricts the third computing device from receiving user input of the first user to the first computing device based on the first security certificate from the first computing device.

15. A computing device for connecting users in an extended reality setting, the computing device comprising:

one or more processors; and memory storing instructions that, when executed by the one or more processors, cause the one or more processors to perform operations that include:

creating, by a client application, a group identifier for an extended reality session, wherein the client application is accessed by an administrator user via an administrator device;

registering, by the client application, the administrator user for the group using an administrator identifier;

registering, by the client application, the administrator device to associate with the administrator identifier wherein registering the administrator device includes creating an administrator security certificate using the group identifier for the group, and wherein the administrator security certificate is to be stored at the administrator device;

registering, by the client application, a first user for the group using a first user identifier for the first user;

registering, by the client application, a first computing device to associate with the first user identifier, wherein registering the first computing device includes creating a first security certificate using the group identifier for the group, and wherein the first security certificate is to be stored at the first computing device;

receiving, by the client application, a request for a second user to join the extended reality session being accessed by the first user via first computing device, wherein the request is received from a second computing device associated with the second user;

receiving, by the client application, a second security certificate from the second computing device;

determining, by the client application and based on the second security certificate, whether to grant the second user access to the extended reality session via the second computing device, wherein determining whether to grant the second computing device access to the extended reality session includes determining whether the second security certificate corresponds to the administrator security certificate or the first security certificate; and causing, by the client application and based on the second security certificate, the second computing device to connect to the extended reality session being accessed by the first computing device, wherein virtual interactions between the first user and the second user are facilitated by the first computing device and the second computing device being connected to the extended reality session.

16. The computing device of claim 15, wherein the administrator device, the first computing device, and the second computing device are separate devices.

17. The computing device of claim 16, wherein the operations further include:

causing, by the client application, a modality of communication during the virtual interactions between the first user and the second user to be restricted.

18. The computing device of claim 16, wherein a third user is accessing the extended reality session via a third computing device, and the operations further include:

causing, by the client application, the third computing device to be restricted from receiving user input of the first user to the first computing device.

19. The computing device of claim 18, wherein the user input includes an audio input that corresponds to a spoken input from the first user to an audio interface of the first computing device.

20. The computing device of claim 19, wherein the operations further include:

causing, based on the second security certificate, the third computing device to receive other input from the second user to the second computing device.

* * * * *